US012634862B2

(12) United States Patent
Mao et al.

(10) Patent No.: US 12,634,862 B2
(45) Date of Patent: May 19, 2026

(54) SERVICE REGISTRATION METHOD, TERMINAL, AND NETWORK SIDE DEVICE

(71) Applicant: VIVO MOBILE COMMUNICATION CO., LTD., Dongguan (CN)

(72) Inventors: Yuanze Mao, Dongguan (CN); Zong-Ying Tsai, Dongguan (CN); Yuan-Chieh Lin, Dongguan (CN); Yanchao Kang, Dongguan (CN); Wen Wang, Dongguan (CN); Zhenhua Xie, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 789 days.

(21) Appl. No.: 17/966,783

(22) Filed: Oct. 15, 2022

(65) Prior Publication Data

US 2023/0030905 A1 Feb. 2, 2023

Related U.S. Application Data

(63) Continuation of application No. PCT/CN2021/086157, filed on Apr. 9, 2021.

(30) Foreign Application Priority Data

Apr. 15, 2020 (CN) .......................... 202010296253.3

(51) Int. Cl.
| | |
|---|---|
| *H04W 60/00* | (2009.01) |
| *H04W 8/18* | (2009.01) |
| *H04W 84/12* | (2009.01) |

(52) U.S. Cl.
CPC ............. *H04W 60/00* (2013.01); *H04W 8/18* (2013.01); *H04W 84/12* (2013.01)

(58) Field of Classification Search
CPC ....... H04W 60/00; H04W 8/18; H04W 84/12; H04W 8/186; H04W 36/00226;
(Continued)

(56) References Cited

U.S. PATENT DOCUMENTS

| | | | | |
|---|---|---|---|---|
| 11,039,297 | B1 * | 6/2021 | Desai | ...................... H04L 65/65 |
| 2017/0223597 | A1 * | 8/2017 | Telang | .................. H04W 36/24 |

(Continued)

FOREIGN PATENT DOCUMENTS

| | | |
|---|---|---|
| CN | 105848227 A | 8/2016 |
| CN | 106900021 A | 6/2017 |

(Continued)

OTHER PUBLICATIONS

Extended European Search Report issued in related European Application No. 21787619.2, mailed Jul. 31, 2023,9 pages.
(Continued)

*Primary Examiner* — Brandon J Miller
(74) *Attorney, Agent, or Firm* — IPX PLLC

(57) ABSTRACT

A service registration method, a terminal, and a network side device are provided. The terminal includes a first subscriber identity card module associated with a first subscriber identity card and a second subscriber identity card module associated with a second subscriber identity card. The method includes: accessing a first mobile network based on the first subscriber identity card; and transmitting a voice over wireless fidelity (VoWiFi) registration message of the second subscriber identity card based on the first mobile network.

18 Claims, 12 Drawing Sheets

(58) Field of Classification Search
CPC ............. H04W 36/1446; H04W 8/183; H04W 60/005; H04W 88/06; H04W 8/26; H04W 48/08; H04L 65/1073; H04L 65/1095; H04L 65/1016; H04M 7/0066
See application file for complete search history.

(56) References Cited

U.S. PATENT DOCUMENTS

| | | | | |
|---|---|---|---|---|
| 2017/0318511 | A1* | 11/2017 | Niranjan | ............... H04B 17/327 |
| 2018/0110081 | A1 | 4/2018 | Serna et al. | |
| 2018/0115978 | A1 | 4/2018 | Shi et al. | |
| 2018/0213392 | A1* | 7/2018 | Ni | ........................ H04W 68/02 |
| 2019/0098487 | A1 | 3/2019 | Boettger | |
| 2019/0110236 | A1 | 4/2019 | Huang et al. | |
| 2019/0124559 | A1* | 4/2019 | Brown | .................. H04W 48/06 |
| 2020/0037281 | A1* | 1/2020 | Lee | ..................... H04L 65/1073 |
| 2021/0068019 | A1* | 3/2021 | Cuevas Ramirez | .. H04W 36/12 |

FOREIGN PATENT DOCUMENTS

| | | |
|---|---|---|
| CN | 107820331 A | 3/2018 |
| CN | 108347724 A | 7/2018 |
| CN | 108476450 A | 8/2018 |
| CN | 108965306 A | 12/2018 |
| CN | 110099421 A | 8/2019 |
| CN | 110248397 A | 9/2019 |
| CN | 111479262 A | 7/2020 |
| CN | 111479309 A | 7/2020 |
| WO | 2019143044 A1 | 7/2019 |

OTHER PUBLICATIONS

International Search Report issued in corresponding International Application No. PCT/CN2021/086157, mailed Jul. 9, 2021, 4 pages.
Qualcomm Incorporated, "Voice fallback triggered by PDU session resource setup", 3GPP TSG-RAN WG3 Meeting#107-BIS-e R3-201785, Apr. 2020.
LG Electronics, "EPS / RAT fallback for IMS voice over ePDG/ N3WIF", 3GPP TSG-SA2 Meeting#135 S2-1909620, Oct. 2019.
First Office Action issued in related Chinese Application No. 202010296253.3, mailed Jun. 8, 2022, 7 pages.
GSM Association Non-confidential, "Requirements for Multi SIM Devices", Oct. 2017.

* cited by examiner

SERVICE REGISTRATION METHOD, TERMINAL, AND NETWORK SIDE DEVICE

CROSS-REFERENCE TO RELATED APPLICATIONS

This application is a continuation of International Application No. PCT/CN2021/086157, filed Apr. 9, 2021, which claims priority to Chinese Patent Application No. 202010296253.3, filed Apr. 15, 2020. The entire contents of each of the above-referenced applications are expressly incorporated herein by reference

TECHNICAL FIELD

The present disclosure relates to the field of communications technologies, and in particular, to a service registration method, a terminal, and a network side device.

BACKGROUND

With the development of Wireless Local Area Networks (WLAN) and Voice over Internet Protocol (VoIP) service, a Voice over Wi-Fi (VoWiFi) technology emerges. The VoWiFi technology is used to implement a wireless VoIP voice call by using an existing Wireless-Fidelity (Wi-Fi) network, so that a terminal can perform a roaming voice service and a video call at any time within the coverage of a WLAN network by using the VoWiFi technology. The VoWiFi technology attracts more and more attention because of low communication costs and the convenience of obtaining a WLAN by a user.

In the related art, in the VoWiFi technology, Wi-Fi is used as an access network, and finally, an IP Multimedia Subsystem (IMS) is accessed.

However, if Wi-Fi is used as an access network in VoWiFi, the terminal cannot perform a VoWiFi service when the terminal is not in a Wi-Fi network environment.

SUMMARY

Embodiments of the present disclosure provide a service registration method, a terminal, and a network side device.

According to a first aspect, an embodiment of the present disclosure provides a service registration method, performed by a terminal, where the terminal includes a first subscriber identity card module and a second subscriber identity card module, the first subscriber identity card module is associated with a first subscriber identity card, the second subscriber identity card module is associated with a second subscriber identity card, and the method includes:

accessing a first mobile network based on the first subscriber identity card; and transmitting a voice over wireless fidelity VoWiFi registration message of the second subscriber identity card based on the first mobile network.

According to a second aspect, an embodiment of the present disclosure provides a service registration method, where the method is performed by a network side device and includes:

in a case that a terminal accesses a first mobile network based on a first subscriber identity card, transmitting a VoWiFi registration message of a second subscriber identity card based on the first mobile network, where the terminal includes a first subscriber identity card module and a second subscriber identity card module, the first subscriber identity card module is associated with the first subscriber identity card, and the second subscriber identity card module is associated with the second subscriber identity card.

According to a third aspect, an embodiment of the present disclosure provides a terminal, where the terminal includes a first subscriber identity card module and a second subscriber identity card module, the first subscriber identity card module is associated with a first subscriber identity card, the second subscriber identity card module is associated with a second subscriber identity card, and the terminal includes:

an accessing module, configured to access a first mobile network based on the first subscriber identity card; and a first transmission module, configured to transmit a voice over wireless fidelity VoWiFi registration message of the second subscriber identity card based on the first mobile network.

According to a fourth aspect, an embodiment of the present disclosure provides a network side device, where the network side device includes:

a first transmission module, configured to: in a case that a terminal accesses a first mobile network based on a first subscriber identity card, transmit a VoWiFi registration message of a second subscriber identity card based on the first mobile network, where the terminal includes a first subscriber identity card module and a second subscriber identity card module, the first subscriber identity card module is associated with the first subscriber identity card, and the second subscriber identity card module is associated with the second subscriber identity card.

According to a fifth aspect, an embodiment of the present disclosure provides a terminal, including a memory, a processor, and a program that is stored in the memory and that can be run on the processor, where when the program is executed by the processor, the steps of the service registration method in the first aspect are implemented.

According to a sixth aspect, an embodiment of the present disclosure provides a network side device, including a memory, a processor, and a program that is stored in the memory and that can be run on the processor, where when the program is executed by the processor, the steps of the service registration method in the second aspect are implemented.

According to a seventh aspect, an embodiment of the present disclosure provides a computer-readable storage medium, where the computer-readable storage medium stores a computer program, and when the computer program is executed by a processor, the steps of the service registration method performed by the terminal provided in the embodiments of the present disclosure are implemented, or when the computer program is executed by a processor, the steps of the service registration method performed by the network side device provided in the embodiments of the present disclosure are implemented.

In the embodiments of the present disclosure, the first mobile network is accessed based on the first subscriber identity card, and the voice over wireless fidelity VoWiFi registration message of the second subscriber identity card is transmitted based on the first mobile network. In this way, VoWiFi registration and a VoWiFi call service of the second subscriber identity card can be performed by using the mobile network accessed by the first subscriber identity card, so that a VoWiFi service can be performed when the terminal is not in a Wi-Fi network environment.

BRIEF DESCRIPTION OF DRAWINGS

The following briefly introduces the accompanying drawings for describing the embodiments of the present disclosure. Apparently, the accompanying drawings in the following description show merely some embodiments of the present disclosure, and a person of ordinary skill in the art may obtain other accompanying drawings from these accompanying drawings without creative efforts.

DETAILED DESCRIPTION

The following describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, the terminal includes but is not limited to a mobile phone, a tablet computer, a notebook computer, a palmtop computer, an in-vehicle mobile terminal, a wearable device, a pedometer, and the like.

Figure 1:
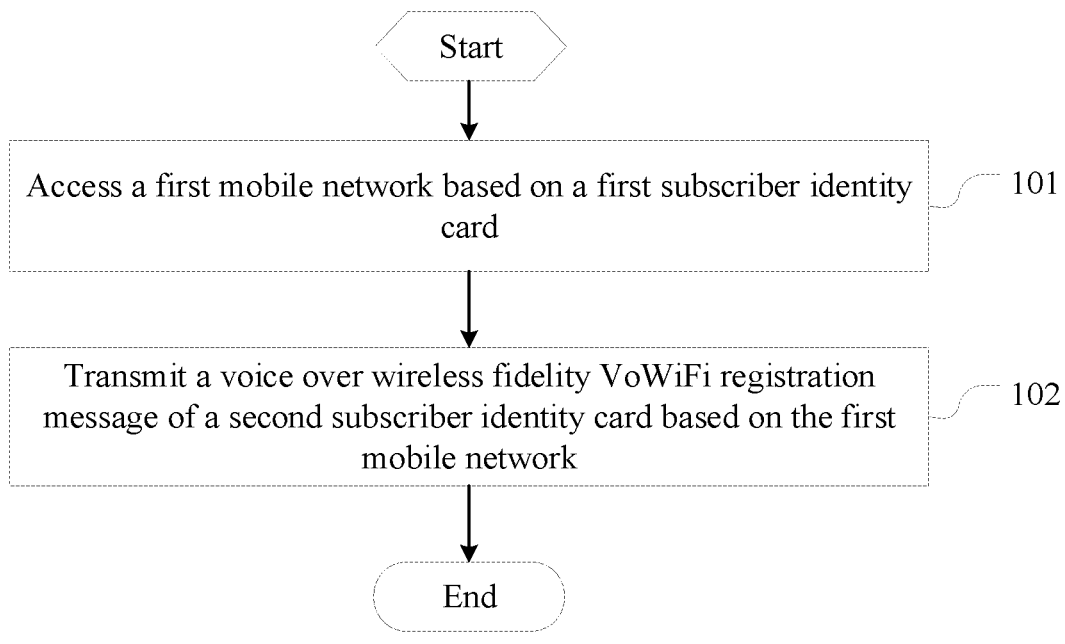
FIG. 1 is a first flowchart of a service registration method according to an embodiment of the present disclosure.

Referring to FIG. 1, FIG. 1 is a first flowchart of a service registration method according to an embodiment of the present disclosure. The method is performed by a terminal. The terminal includes a first subscriber identity card module and a second subscriber identity card module, the first subscriber identity card module is associated with a first subscriber identity card, and the second subscriber identity card module is associated with a second subscriber identity card. As shown in FIG. 1, the method includes the following steps:

Step 101: Access a first mobile network based on the first subscriber identity card.

The first mobile network may be accessed based on the first subscriber identity card in a case that the terminal is not connected to Wi-Fi, for example, no Wi-Fi is available. For example, the terminal is a mobile phone. The first subscriber identity card and the second subscriber identity card may be respectively a SIM card 1 and a SIM card 2 of the mobile phone. A data network switch of the mobile phone may be enabled to connect the mobile phone to a mobile network. The first mobile network may be an LTE network, or may be another network. The terminal may communicate with the first subscriber identity card by using the first subscriber identity card module, and may communicate with the second subscriber identity card by using the second subscriber identity card module.

Step 102: Transmit a voice over wireless fidelity VoWiFi registration message of the second subscriber identity card based on the first mobile network.

The voice over wireless fidelity VoWiFi registration message of the second subscriber identity card may be transmitted based on the first mobile network in a case that no wireless local area network signal is detected; or the voice over wireless fidelity VoWiFi registration message of the second subscriber identity card may be transmitted based on the first mobile network in a case that no wireless local area network signal is detected and a mobile network signal parameter of the second subscriber identity card is less than a first preset value; or the voice over wireless fidelity VoWiFi registration message of the second subscriber identity card may be transmitted based on the first mobile network in a case that no wireless local area network signal is detected, a mobile network signal parameter of the second subscriber identity card is less than a first preset value, and a mobile network signal parameter of the first subscriber identity card is greater than a seventh preset value. This is not limited in this embodiment of the present disclosure.

In addition, the transmitting a voice over wireless fidelity VoWiFi registration message of the second subscriber identity card based on the first mobile network may be transmitting the VoWiFi registration message of the second subscriber identity card between the terminal and a network side device based on the first mobile network.

In actual application, an operator may use a Wi-Fi hotspot to provide a voice service for a user by using a VoWiFi technology. The user may make or answer a voice or video call by using the VoWiFi technology through Wi-Fi access while using the mobile Internet. In the prior art, available Wi-Fi needs to be connected to use VoWiFi, but the user cannot use VoWiFi in an outdoor area or a place without Wi-Fi. In this embodiment of the present disclosure, the first mobile network is accessed based on the first subscriber identity card, and the voice over wireless fidelity VoWiFi registration message of the second subscriber identity card is transmitted based on the first mobile network. In this way, the second subscriber identity card of the terminal can perform a VoWiFi service by using mobile network data traffic of the first subscriber identity card in a case that no Wi-Fi is available.

It should be noted that, currently, VoWiFi may be implemented in three networking modes: untrusted access to a 3GPP network through an S2b interface protocol, trusted access to a 3GPP network through an S2a interface protocol, and direct access to an IMS through an S2c interface protocol network. For these three networking modes, in view of the technical side, especially impact on a network and terminal maturity, for operators who have deployed a large quantity of WLAN access points, trusted access to the 3GPP network through the S2a interface protocol requires upgrading or direct replacement of WLAN access point devices in the whole network, which has the advantages of long construction period, high costs and great difficulty; and untrusted access to the 3GPP network through the S2b interface protocol can combine openness of a public Wi-Fi network with high reliability and QoS guarantee of an operator core network, to implement seamless switching of voice between a WLAN and an LTE network at low costs. Therefore, the solution of untrusted access to the 3GPP network through the S2b interface protocol will gradually replace the solution of trusted access to the 3GPP network through the S2a interface protocol, and become a feasible VoWiFi networking solution. In the networking solution of untrusted access to the 3GPP network through the S2b interface protocol, the terminal may access a 3GPP network of an operator through an untrusted domain Wi-Fi network. After authentication, a call request may be routed to an IMS for processing, to implement IMS services such as a voice service, a short message service, and a supplementary service. In addition, in the networking solution of untrusted access to the 3GPP network through the S2b interface protocol, to implement a VoWiFi service, only an Evolved Packet Data Gateway (EPDG) network element and a 3GPP Authentication Authorization and Accounting (AAA) network element need to be added. In this embodiment of the present disclosure, the VoWiFi service may be implemented by using the networking solution of untrusted access to the 3GPP network through the S2b interface protocol.

Figure 2:
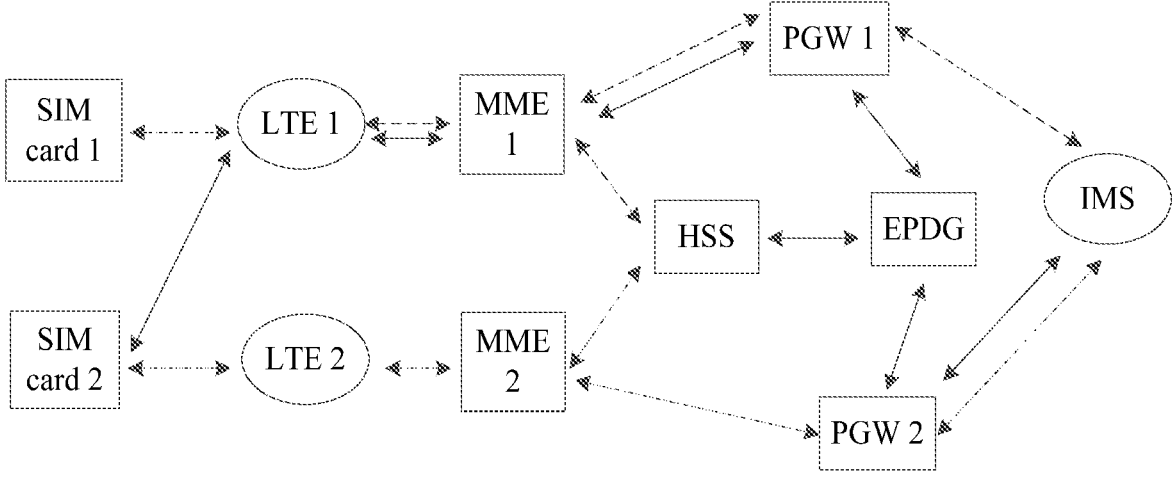
FIG. 2 is a schematic structural diagram of networking according to an embodiment of the present disclosure.

In addition, the network side device may include a core network device. As shown in FIG. 2, the network side device may include the following network elements: a Mobility Management Entity (MME), a Packet Data Network GW (PGW), an EPDG, and a Home Subscriber Server (HSS). The terminal may access an LTE network, and SIM card 1 and SIM card 2 of the terminal may communicate with the network side device by using the LTE network. As shown in FIG. 2, SIM card 1 may be registered with VoLTE by using an LTE 1 network through communication among the LTE 1 network, an MME 1, a PGW 1, the HSS, and an IMS server. The SIM card 2 may be registered with VoLTE by using an LTE 2 network through communication among the LTE 2 network, an MME 2, a PGW 2, the HSS, and the IMS server, and the SIM card 2 may be switched, through communication among the LTE 1 network, the MME 1, the PGW 1, the HSS, the EPDG, the PGW 2, and the IMS server, from VoLTE to VoWiFi by using the LTE 1 network connected to the SIM card 1.

In actual application, in an implementation, the SIM card 1 and SIM card 2 may be disposed on the terminal, the SIM card 1 and SIM card 2 may both be registered with VoLTE, and SIM card 1 may be connected to the first mobile network. When network signal quality and strength of SIM card 1 are relatively strong and the SIM card 1 is in an idle state, and a network signal of SIM card 2 is relatively weak or there is no network signal, SIM card 2 may be registered with VoWiFi by using a network connected to the SIM card 1, and the SIM card 2 may perform dialing or answering by using VoWiFi. The SIM card 1 and SIM card 2 may access the LTE network, and the MME may separately register Access Point Name (APN) and PGW information of SIM card 1 and SIM card 2 with the HSS. If the terminal detects that a mobile network signal parameter of SIM card 2 is less than the first preset value, and a mobile network signal parameter of SIM card 1 is greater than the seventh preset value, SIM card 2 may be triggered to switch to VoWiFi. SIM card 2 may be attached to the EPDG by using the first mobile network connected to SIM card 1. The EPDG may obtain the APNs and the PGW information from the HSS. The EPDG may select the same PGW before access and switching, and delete the original resources of the SIM card 2 on the PGW side. After SIM card 2 is registered with VoWiFi by using the EPDG and the PGW, a call may be made by using VoWiFi. When the terminal detects that the mobile network signal parameter of SIM card 2 is greater than a second preset value, and/or the mobile network signal parameter of SIM card 1 is less than a third preset value, SIM card 2 may be triggered to switch from VoWiFi to VoLTE.

In actual application, in another implementation, the SIM card 1 and the SIM card 2 may be disposed on the terminal. When the terminal is a dual-card single-pass terminal, when the SIM card 1 is on a VoLTE call and network signal quality and strength of the SIM card 1 are relatively strong, the SIM card 2 may be registered with VoWiFi by using a network connected to the SIM card 1, and the SIM card 2 may perform dialing or answering by using VoWiFi. The SIM card 1 and the SIM card 2 may access the LTE network, and the MME may separately register APNs and PGW information of the SIM card 1 and the SIM card 2 with the HSS. When the SIM card 1 is on a VoLTE call and the network signal quality and strength of the SIM card 1 are relatively strong, the SIM card 2 may be triggered to switch to VoWiFi. The SIM card 2 may be attached to the EPDG by using the first mobile network connected to the SIM card 1. The EPDG obtains the APNs and the PGW information from the HSS. The EPDG may obtain the APNs and the PGW information from the HSS. The EPDG may select the same PGW before access and switching, and delete original resources of the SIM card 2 on the PGW side. After the SIM card 2 is registered with VoWiFi by using the EPDG and the PGW, a call may be made by using VoWiFi when the SIM card 2 receives a call. After the VoLTE call of the SIM card 1 ends, if the terminal detects that a mobile network signal parameter of the SIM card 2 is greater than a second preset value, and/or a mobile network signal parameter of the SIM card 1 is less than a third preset value, the SIM card 2 may be triggered to switch from VoWiFi to VoLTE.

It should be noted that if the SIM card 2 fails to detect a network signal or does not access the LTE network, in a process of performing VoWiFi registration, an attach identifier may be directly carried in a registration message to perform VoWiFi registration.

In this embodiment of the present disclosure, the first mobile network is accessed based on the first subscriber identity card, and the voice over wireless fidelity VoWiFi registration message of the second subscriber identity card is transmitted based on the first mobile network. In this way, VoWiFi registration and a VoWiFi call service of the second subscriber identity card can be performed by using the mobile network accessed by the first subscriber identity card, so that a VoWiFi service can be performed when the terminal is not in a Wi-Fi network environment.

In some embodiments, before the transmitting a voice over wireless fidelity VoWiFi registration message of the second subscriber identity card based on the first mobile network, the method further includes:

sending a first handover request message to a network side device in a case that a wireless local area network signal is not detected and a mobile network signal parameter of the second subscriber identity card is less than a first preset value, where the first handover request message is used by the second subscriber identity card to request to perform a VoWiFi service; and receiving a first handover response message sent by the network side device, where the first handover response message includes a network address of an evolved packet data gateway EPDG network element of the network side device; and the transmitting a voice over wireless fidelity VoWiFi registration message of the second subscriber identity card based on the first mobile network includes:

transmitting the voice over wireless fidelity VoWiFi registration message of the second subscriber identity card based on the first mobile network and the network address of the EPDG network element.

The mobile network signal parameter may include at least one of the parameters such as Reference Signal Received Quality (RSRQ), Reference Signal Received Power (RSRP) of a downlink reference signal, or a Signal-to-Noise Ratio (SNR). If the mobile network signal parameter of the second subscriber identity card is less than the first preset value, it may be considered that a network signal of an access network of the second subscriber identity card is relatively poor. If the terminal fails to detect a wireless local area network signal, it may be considered that the terminal is not in a wireless local area network environment. The first handover request message may be sent to the network side device in a case that the second subscriber identity card is registered with VoLTE by using a second mobile network. The second subscriber identity card may access the second mobile network, may send the first handover request message to the network side device by using the first mobile network or the second mobile network, and may receive, by using the first mobile network or the second mobile network, the first handover response message sent by the network side device. The first handover request message may be further used by the second subscriber identity card to request to perform a VoWiFi service based on the first mobile network.

Figure 3:
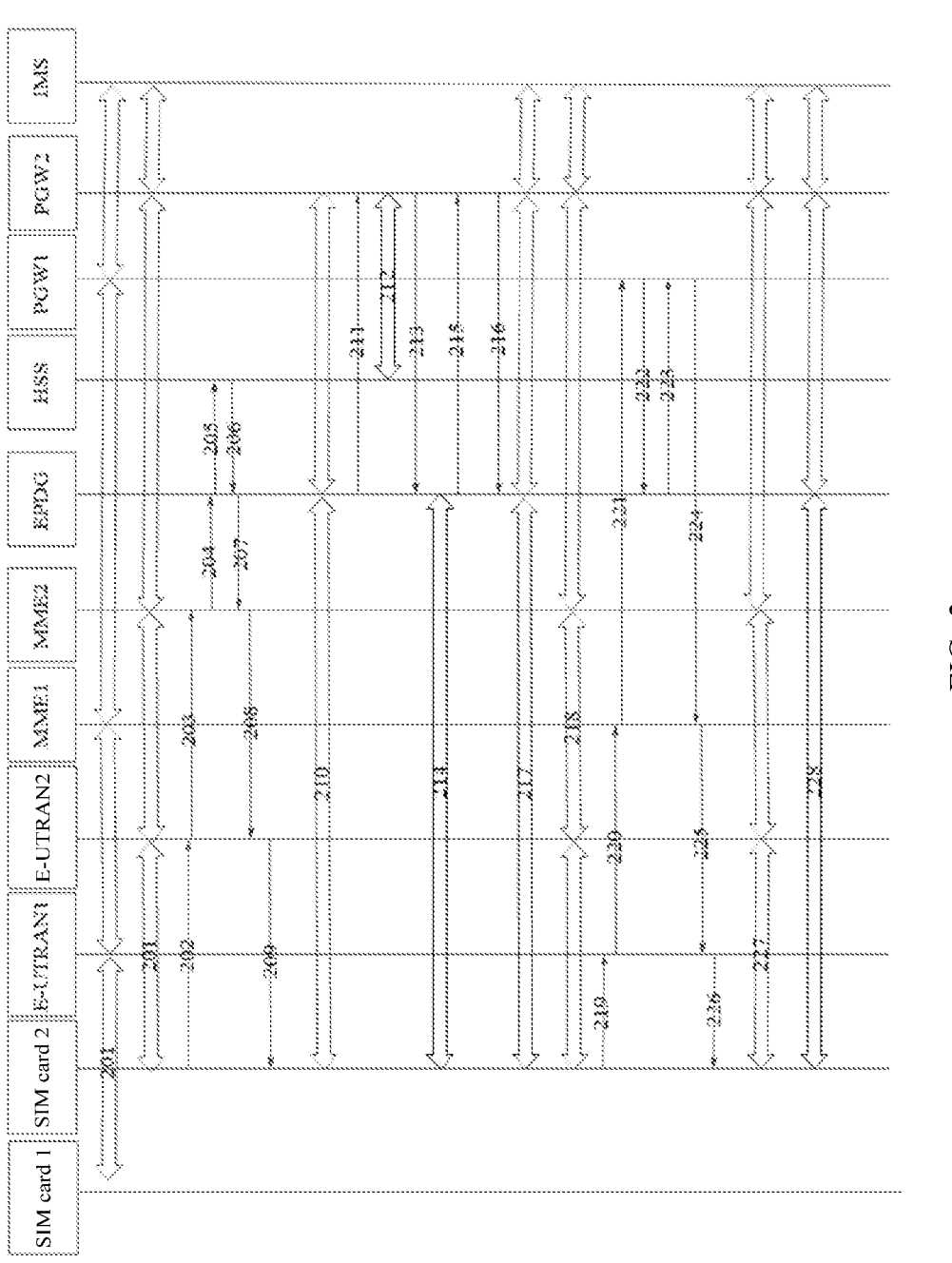
FIG. 3 is a first schematic diagram of signaling interaction in a service registration method according to an embodiment of the present disclosure.

In actual application, the first subscriber identity card is a SIM card 1, and the second subscriber identity card is a SIM card 2. When the network signal quality and strength of SIM card 1 are relatively strong and SIM card 1 is in an idle state, and the signal quality and strength of SIM card 2 are relatively weak, SIM card 2 may be registered with VoWiFi by using a network connected to SIM card 1, and SIM card 2 may perform dialing or answering by using VoWiFi. The SIM card may communicate with the network side device by using an Evolved UMTS Terrestrial Radio Access Network (E-UTRAN). As shown in FIG. 3, the service registration method may include the following interaction process:

201. A SIM card 1 and a SIM card 2 are inserted into a terminal (UE), where both SIM card 1 and SIM card 2 may be registered with VoLTE, and the terminal fails to detect a wireless local area network signal.

202. If the UE detects that a mobile network signal parameter of SIM card 2 is less than a first preset value, and a mobile network signal parameter of SIM card 1 is greater than a seventh preset value, a first handover request message such as a Wi-Fi handover request message may be sent to an E-UTRAN 2, where the Wi-Fi handover request may be used to instruct a network to switch to VoWiFi in advance.

203. The E-UTRAN 2 may forward the Wi-Fi handover request message to an MME 2.

204. The MME 2 receives the Wi-Fi handover request message, and may send the Wi-Fi handover request message to an EPDG, and the MME2 may obtain a network address of the EPDG through a DNS query.

205. After the EPDG receives the Wi-Fi handover request message, the EPDG may obtain information such as an APN 2 and a PGW 2 from an HSS.

206. The HSS sends the information such as the APN 2 and the PGW 2 to the EPDG.

207. The EPDG delivers a first handover response message such as a Wi-Fi handover response message to the MME 2, where the Wi-Fi handover response message carries information such as an APN 2, a PGW 2, and a network address of the EPDG.

208. The MME 2 forwards the Wi-Fi handover response message to the E-UTRAN 2.

209. The E-UTRAN 2 forwards the Wi-Fi handover response message to the UE.

210. The SIM card 2 of the UE obtains, through parsing, information such as the network address of the EPDG carried in the Wi-Fi handover response message, and may perform an IKEv2 procedure by using the network address of the EPDG to complete IKE tunnel creation and 3GPP AAA authentication, and obtain, from a third EAP response message, PGW 2 information used when the SIM card 2 of the UE is registered with VoLTE. In addition, in this authentication procedure, if the UE keeps the network address during a handover, a service IP that is previously obtained when the E-UTRAN 2 is accessed is carried in CFG_Request in IKE signaling.

211. After receiving the third EAP response message, the EPDG starts to send a create session request message to the PGW 2, where the message may carry an IP address of the UE obtained from an IKE message; and the EPDG may set a handover identifier to 1 and set an RAT type to a WLAN.

212. After receiving the create session request message, the PGW 2 may interact with a PCRF by using a CCR/CCA message to obtain rule information corresponding to a Wi-Fi access scenario. The PGW 2 may report PGW ID information to 3GPP AAA through an AAR message, and the 3GPP AAA synchronizes the information to the HSS. The HSS may synchronize the PGW 2 information in the APN corresponding to the voice to the MME 2 by using an insert subscriber data message.

213. The PGW 2 may return a modify bearer response message to the EPDG for confirmation. After receiving a create session response message, the EPDG may send an IKE_AUTH message to the UE to complete an IPsec tunnel creation procedure.

214. The EPDG and the SIM card 2 of the UE complete IKEv2 message interaction and create an IPSec tunnel.

215. Because the handover identifier is set in step 211, the EPDG may send a modify bearer request message to the PGW 2. After receiving the modify bearer request message, the PGW 2 may hand over a downlink tunnel from 3GPP to a WLAN side.

216. The PGW 2 may return the modify bearer response message to the EPDG for confirmation.

217. The SIM card 2 of the UE may create an IPSec tunnel and a GTP tunnel by using an IP connection between the E-UTRAN 1 and the PGW 2, to be registered with VoWiFi, and may perform a call service by using VoWiFi.

218. The PGW 2 may initiate a PDN GW initiated bearer deactivation (S5/S8 uses GTP) process for 3GPP access, to release resources of VoLTE with which the SIM card 2 is previously registered.

In this implementation, the terminal actively sends the first handover request message, so that the second subscriber identity card is attached to the EPDG network element based on the first mobile network, thereby reducing pressure on the network side device.

In some embodiments, before the transmitting a voice over wireless fidelity VoWiFi registration message of the second subscriber identity card based on the first mobile network, the method further includes:

sending first measurement report information to a network side device, where the first measurement report information includes a mobile network signal parameter of the second subscriber identity card;

receiving a first handover command message sent by the network side device, where the first handover command message is used to instruct the second subscriber identity card to perform VoWiFi registration; and obtaining a network address of an EPDG network element of the network side device; and the transmitting a voice over wireless fidelity VoWiFi registration message of the second subscriber identity card based on the first mobile network includes:

transmitting the VoWiFi registration message of the second subscriber identity card based on the first mobile network and the network address of the EPDG network element.

The obtaining a network address of an EPDG network element of the network side device may be that the terminal may prestore the network address of the EPDG network element of the network side device, or the terminal may query and obtain the network address of the EPDG network element of the network side device by using a DNS server. The first measurement report information may be sent to the network side device in a case that the second subscriber identity card is registered with VoLTE by using the second mobile network. The second subscriber identity card may access the second mobile network, may send the first measurement report information to the network side device by using the first mobile network or the second mobile network, and may receive, by using the first mobile network or the second mobile network, the first handover command message sent by the network side device.

In addition, the terminal may send the first measurement report information to the network side device at a time interval, or may send the first measurement report information to the network side device in a case that a preset condition is met, where the preset condition may include at least one of the following: the terminal fails to detect a wireless local area network signal, the mobile network signal parameter of the second subscriber identity card is less than the first preset value, or the mobile network signal parameter of the first subscriber identity card is greater than the seventh preset value.

It should be noted that the network side device may send the first handover command message to the terminal in a case that the terminal fails to detect a wireless local area network signal and the mobile network signal parameter of the second subscriber identity card is less than a fourth preset value. The fourth preset value may be the same as the first preset value, or may be different from the first preset value. The first handover command message may be further used to instruct the second subscriber identity card to perform VoWiFi registration based on the first mobile network.

Figure 4:
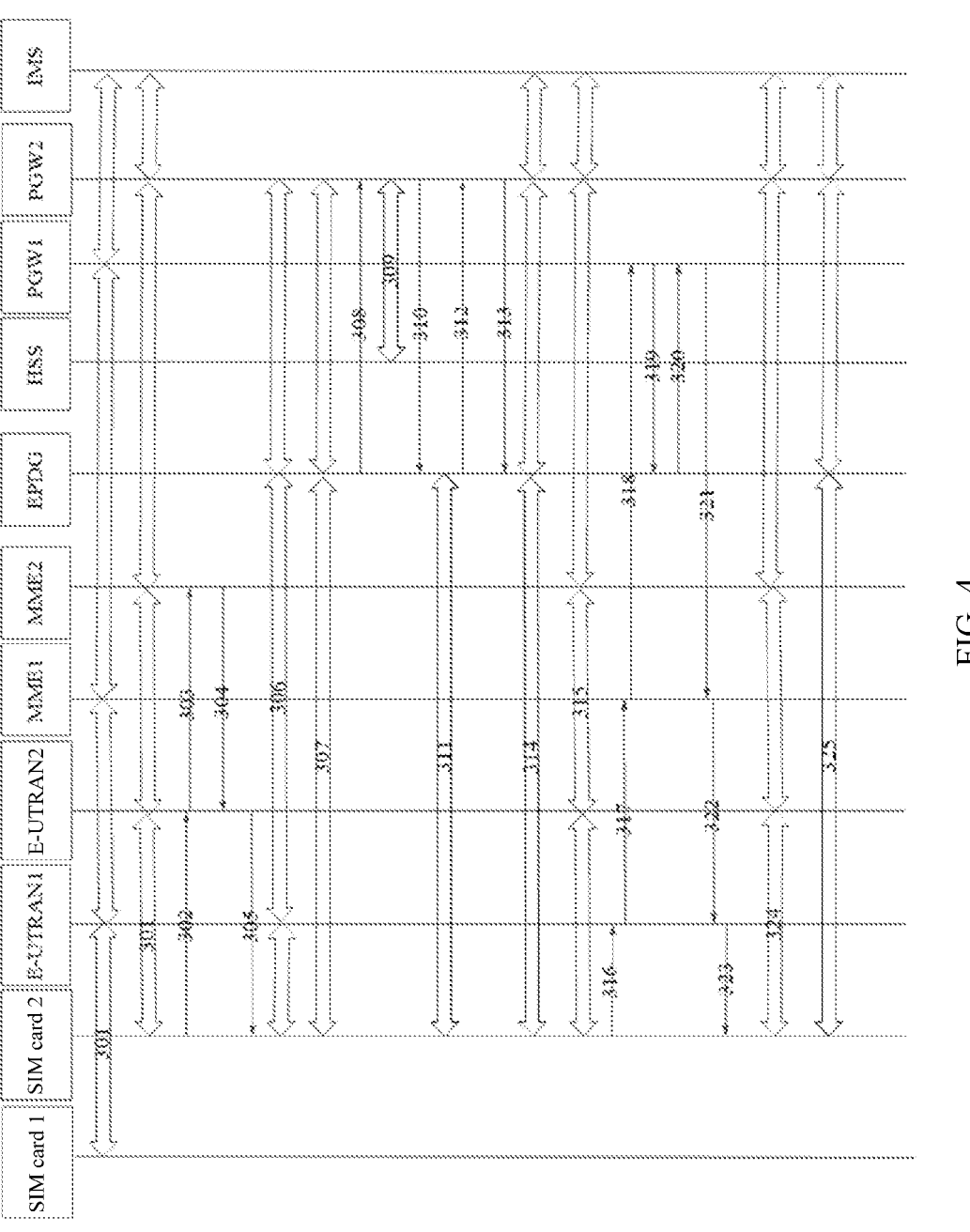
FIG. 4 is a second schematic diagram of signaling interaction in a service registration method according to an embodiment of the present disclosure.

In actual application, the first subscriber identity card is a SIM card 1, and the second subscriber identity card is a SIM card 2. When network signal quality and strength of the SIM card 1 are relatively strong and the SIM card 1 is in an idle state, and signal quality and strength of the SIM card 2 are relatively weak, the SIM card 2 may be registered with VoWiFi by using a network connected to the SIM card 1, and the SIM card 2 may perform dialing or answering by using VoWiFi. As shown in FIG. 4, the service registration method may include the following interaction process:

301. A SIM card 1 and a SIM card 2 are inserted into a terminal (UE), where both the SIM card 1 and the SIM card 2 may be registered with VoLTE, and the terminal fails to detect a wireless local area network signal.

302. If the UE detects that a mobile network signal parameter of the SIM card 2 is less than a fourth preset value, first measurement report information such as a measurement report (event Z3) may be sent to an E-UTRAN 2, where measurement signal quality and strength information of a serving cell of the SIM card 2 and a serving cell of the SIM card 1 are carried.

303. The E-UTRAN 2 may forward the measurement report (event Z3) to an MME 2.

304. If the MME 2 determines that the mobile network signal parameter of the SIM card 2 is less than the fourth preset value, and a mobile network signal parameter of the SIM card 1 is greater than a seventh preset value, the MME 2 may deliver a first handover command message such as a Wi-Fi handover command message to the E-UTRAN 2; otherwise, the MME 2 does not deliver the Wi-Fi handover command.

305. After receiving the Wi-Fi handover command message delivered by the MME 2, the E-UTRAN 2 may send the Wi-Fi handover command message to the UE, to instruct the SIM card 2 of the UE to perform a VoWiFi service by using a mobile data network of the SIM card 1.

306. The UE may discover an EPDG or preconfigure an EPDG by using a DNS, and may perform authentication in an LTE network of the SIM card 1.

Step 306 may be triggered in two cases. In the first case, the UE receives the Wi-Fi handover command message delivered by the MME 2, to trigger the SIM card 2 of the UE to perform the VoWiFi service by using the mobile data network of the SIM card 1. In the second case, the SIM card 2 of the UE has no network signal at all, and the SIM card 2 of the UE may be triggered to perform the VoWiFi service by using the mobile data network of the SIM card 1.

307. The SIM card 2 of the UE may complete IKE tunnel creation and 3GPP AAA authentication in an IKEv2 procedure, and obtain, from a third EAP response message, PGW 2 information used when the SIM card 2 of the UE is registered with VoLTE. In addition, in this authentication procedure, if the UE keeps the network address during a handover, a service IP that is previously obtained when the E-UTRAN 2 is accessed is carried in CFG_Request in IKE signaling.

308. After receiving the third EAP response message, the EPDG starts to send a create session request message to the PGW 2, where the message may carry an IP address of the UE obtained from an IKE message; and the EPDG may set a handover identifier to 1 and set an RAT type to a WLAN.

309. After receiving the create session request message, the PGW 2 may interact with a PCRF by using a CCR/CCA message to obtain rule information corresponding to a Wi-Fi access scenario. The PGW 2 may report PGW ID information to 3GPP AAA through an AAR message, and the 3GPP AAA synchronizes the information to the HSS. The HSS may synchronize the PGW 2 information in the APN corresponding to the voice to the MME 2 by using an insert subscriber data message.

310. The PGW 2 may return a modify bearer response message to the EPDG for confirmation. After receiving a create session response message, the EPDG may send an IKE_AUTH message to the UE to complete an IPsec tunnel creation procedure.

311. The EPDG and the SIM card 2 of the UE complete IKEv2 message interaction and create an IPSec tunnel.

312. Because the handover identifier is set in step 308, the EPDG may send a modify bearer request message to the PGW 2. After receiving the modify bearer request message, the PGW 2 may hand over a downlink tunnel from 3GPP to a WLAN side.

313. The PGW 2 may return the modify bearer response message to the EPDG for confirmation.

314. The SIM card 2 of the UE may create an IPSec tunnel and a GTP tunnel by using an IP connection between the E-UTRAN 1 and the PGW 2, to be registered with VoWiFi, and may perform a call service by using VoWiFi.

315. The PGW 2 may initiate a PDN GW initiated bearer deactivation (S5/S8 uses GTP) process for 3GPP access, to release resources of VoLTE with which the SIM card 2 is previously registered.

In this implementation, the terminal adds the mobile network signal parameter of the second subscriber identity card to the reported measurement report information, and the network side device actively delivers the first handover command message, so that the second subscriber identity card is attached to the EPDG network element based on the first mobile network, thereby reducing pressure on the terminal side.

In some embodiments, before the transmitting the VoWiFi registration message of the second subscriber identity card based on the first mobile network and the network address of the EPDG network element, the method further includes:

transmitting a call service message of the second subscriber identity card based on a second mobile network and a packet data network gateway PGW network element of the network side device, where the terminal accesses the second mobile network based on the second subscriber identity card; and the transmitting the VoWiFi registration message of the second subscriber identity card based on the first mobile network and the network address of the EPDG network element includes:

transmitting the VoWiFi registration message of the second subscriber identity card based on the first mobile network, the network address of the EPDG network element, and the PGW network element.

The second mobile network may be an LTE network, or may be another network. For example, the second subscriber identity card is registered with VoLTE by using the second mobile network. A VoLTE call service message of the second subscriber identity card may be transmitted between the terminal and a PGW network element of the network side device. When the second subscriber identity card is switched from VoLTE to VoWiFi, a PGW network element that is previously used to transmit the VoLTE call service message of the second subscriber identity card may be used, so that call continuity can be maintained. When the second subscriber identity card is switched from VoLTE to VoWiFi, if the second subscriber identity card is on a VoLTE call, the PGW network element before the switching may be used. If the second subscriber identity card is not on a VoLTE call, any PGW network element may be used.

In this implementation, in a process of transmitting the VoWiFi registration message of the second subscriber identity card between the terminal and the network side device, the PGW network element that is previously used to transmit the call service message of the second subscriber identity card is used, so that call continuity can be maintained, thereby improving call quality.

In some embodiments, the method further includes:

sending a second handover request message to a network side device in a case that a mobile network signal parameter of the second subscriber identity card is greater than a second preset value, and/or a mobile network signal parameter of the first subscriber identity card is less than a third preset value, where the second handover request message is used to request to switch a call service of the second subscriber identity card to a VoLTE service;

receiving a second handover response message sent by the network side device, where the second handover response message is used to instruct to switch the call service of the second subscriber identity card to the VoLTE service; and switching the call service of the second subscriber identity card from a VoWiFi service to the VoLTE service.

If the mobile network signal parameter of the second subscriber identity card is greater than the second preset value, it may be considered that a network signal of the second subscriber identity card is relatively good; and if the mobile network signal parameter of the first subscriber identity card is less than the third preset value, it may be considered that a network signal of the first subscriber identity card is relatively poor. The second subscriber identity card may access the second mobile network, may send the second handover request message to the network side device by using the first mobile network or the second mobile network, and may receive, by using the first mobile network or the second mobile network, the second handover response message sent by the network side device.

In actual application, the first subscriber identity card is a SIM card 1, and the second subscriber identity card is a SIM card 2. As shown in FIG. 3, the service registration method may further include the following interaction process:

219. When the UE detects that a mobile network signal parameter of the SIM card 2 is greater than a second preset value, and/or a mobile network signal parameter of the SIM card 1 is less than a third preset value, a second handover request message such as a Wi-Fi handover request may be sent to the E-UTRAN 1.

220. The E-UTRAN 1 may forward the Wi-Fi handover request message to the MME 1.

221. The MME 1 may forward the Wi-Fi handover request message to a PGW 1.

222. The PGW 1 may forward the Wi-Fi handover request message to the EPDG.

223. After receiving the Wi-Fi handover request message, the EPDG may deliver a second handover response message such as a Wi-Fi handover response message to the PGW 1, where the Wi-Fi handover response message may carry the APN 2 and the PGW 2 information before a handover.

224. After receiving the Wi-Fi handover response message, the PGW 1 may forward the Wi-Fi handover response message to the MME 1.

225. The MME 1 may forward the received Wi-Fi handover response message to the E-UTRAN 1.

226. After receiving the Wi-Fi handover response message delivered by the MME 1, the E-UTRAN 1 may send the Wi-Fi handover response message to the UE, to instruct the SIM card 2 of the UE to perform a VoLTE service by using a mobile data network of the E-UTRAN 2.

227. After receiving the Wi-Fi handover response message, the SIM card 2 of the UE may obtain the APN 2 and the PGW 2 information through parsing, and is attached to an LTE network by using the APN 2 and the PGW 2 information through the E-UTRAN 2, and is registered with VoLTE to perform a VoLTE service.

228. The PGW 2 may initiate release of a related bearer resource on a WLAN side of the SIM card 2 of the UE, and the SIM card 2 of the UE may initiate de-attachment of the EPDG.

In this implementation, the terminal actively sends the second handover request message to the network side device, and switches the call service of the second subscriber identity card from the VoWiFi service to the VoLTE service, so that the call service of the second subscriber identity card can be switched from the VoWiFi service to the VoLTE service in a case that a network signal of the second subscriber identity card is relatively good or a network signal of the first subscriber identity card is relatively poor, to avoid occupying the first mobile network of the first subscriber identity card, thereby improving call quality.

In some embodiments, the method further includes:

sending second measurement report information to a network side device, where the second measurement report information includes mobile network signal parameters of the second subscriber identity card and the first subscriber identity card;

receiving a second handover command message sent by the network side device, where the second handover command message is used to instruct to switch a call service of the second subscriber identity card to a VoLTE service; and switching the call service of the second subscriber identity card from a VoWiFi service to the VoLTE service.

The second subscriber identity card may access the second mobile network, may send the second measurement report information to the network side device by using the first mobile network or the second mobile network, and may receive, by using the first mobile network or the second mobile network, the second handover command message sent by the network side device.

In addition, the network side device may send the second handover command message to the terminal in a case that the mobile network signal parameter of the second subscriber identity card is greater than a fifth preset value, and/or the mobile network signal parameter of the first subscriber identity card is less than a sixth preset value. The fifth preset value may be the same as the second preset value, or may be different from the second preset value. The sixth preset value may be the same as the third preset value, or may be different from the third preset value. If the mobile network signal parameter of the second subscriber identity card is greater than the fifth preset value, it may be considered that a network signal of the second subscriber identity card is relatively good; and if the mobile network signal parameter of the first subscriber identity card is less than the sixth preset value, it may be considered that a network signal of the first subscriber identity card is relatively poor.

In actual application, the first subscriber identity card is a SIM card 1, and the second subscriber identity card is a SIM card 2. As shown in FIG. 4, the service registration method may further include the following interaction process:

316. If the UE detects that the mobile network signal parameter of the SIM card 2 is greater than a fifth preset value, and/or the mobile network signal parameter of the SIM card 1 is less than a sixth preset value, the UE may send second measurement report information such as a measurement report (event Z3) to the E-UTRAN 1, where measurement signal quality and strength information of a serving cell of the SIM card 2 and a serving cell of the SIM card 1 are carried.

317. The E-UTRAN 1 may forward the measurement report (event Z3) information to an MME 1.

318. The MME 1 may forward the measurement report (event Z3) information to a PGW 1.

319. The PGW 1 may forward the measurement report (event Z3) information to the EPDG.

320. If the EPDG detects that the mobile network signal parameter of the SIM card 2 is greater than the fifth preset value, and/or the mobile network signal parameter of the SIM card 1 is less than the sixth preset value, the EPDG may deliver a second handover command message such as a Wi-Fi handover command message to the PGW 1; otherwise, the EPDG does not deliver the Wi-Fi handover command message.

321. The PGW 1 may forward the received Wi-Fi handover command message to the MME 1.

322. The MME 1 may forward the received Wi-Fi handover command message to the E-UTRAN 1.

323. The E-UTRAN 1 may send the received Wi-Fi handover command message to the UE, to instruct the SIM card 2 of the UE to perform a VoLTE service by using a mobile data network of the E-UTRAN 2.

324. The SIM card 2 of the UE may be attached to an LTE network by using the E-UTRAN 2, and is registered with VoLTE to perform a VoLTE service.

325. The PGW 2 may initiate a release process of a related bearer resource on a WLAN side of the SIM card 2 of the UE, and the SIM card 2 of the UE may initiate de-attachment of the EPDG.

In this implementation, the terminal adds the mobile network signal parameters of the second subscriber identity card and the first subscriber identity card to the reported measurement report information, and the network side device instructs to switch the call service of the second subscriber identity card from the VoWiFi service to the VoLTE service, so that the call service of the second subscriber identity card can be switched from the VoWiFi service to the VoLTE service in a case that a network signal of the second subscriber identity card is relatively good or a network signal of the first subscriber identity card is relatively poor, to avoid occupying the first mobile network of the first subscriber identity card, thereby improving call quality.

Figure 5:
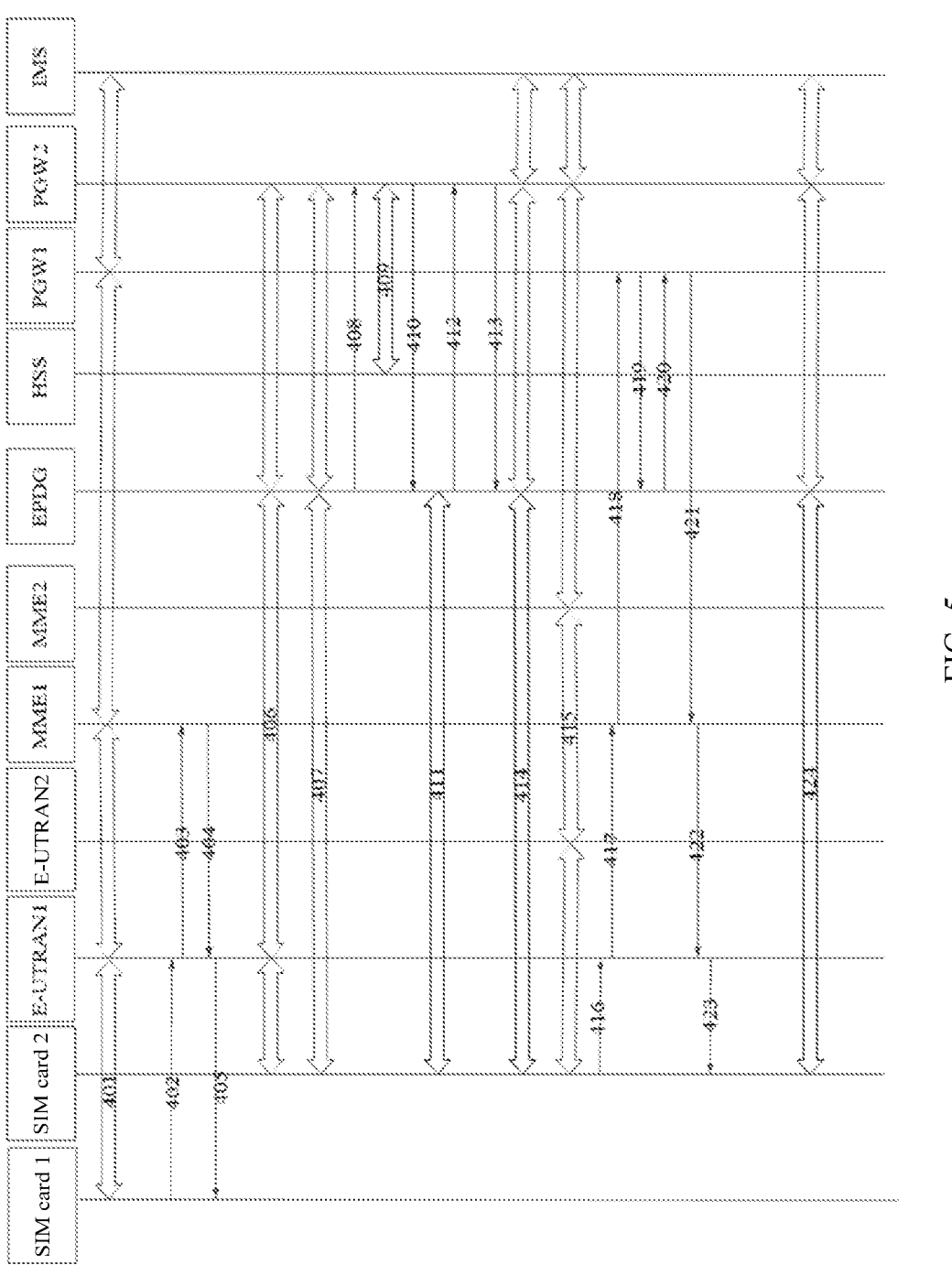
FIG. 5 is a third schematic diagram of signaling interaction in a service registration method according to an embodiment of the present disclosure.

In a specific embodiment, the first subscriber identity card is a SIM card 1, and the second subscriber identity card is a SIM card 2. The terminal may be a dual-card single-pass terminal. When network signal quality and strength of the SIM card 1 are relatively strong and a VoLTE call service is being performed, the SIM card 2 may perform a VoWiFi call service by using a network connected to the SIM card 1, and the SIM card 2 may perform dialing or answering by using VoWiFi. As shown in FIG. 5, the service registration method may include the following interaction process:

401. A SIM card 1 and a SIM card 2 are inserted into a terminal (UE), where the SIM card 1 is performing a VoLTE call service, a network connected to the SIM card 1 is an LTE network, and the terminal fails to detect a wireless local area network signal.

402. If the UE detects that a mobile network signal parameter of the SIM card 1 is greater than a seventh preset value, the SIM card 1 may send a measurement report (event Z3) to an E-UTRAN 1, where measurement signal quality and strength information of a serving cell of the SIM card 2 and a serving cell of the SIM card 1 are carried.

403. The E-UTRAN 1 may forward the measurement report (event Z3) to an MME 1.

404. If the MME 1 determines that the mobile network signal parameter of the SIM card 1 is greater than the seventh preset value, and the SIM card 1 is performing a VoLTE call service, the MME 1 may deliver a Wi-Fi handover command message to the E-UTRAN 1; otherwise, the MME 1 does not deliver the Wi-Fi handover command.

405. After receiving the Wi-Fi handover command message delivered by the MME 1, the E-UTRAN 1 may send the Wi-Fi handover command message to the UE, to instruct the SIM card 2 of the UE to perform a VoWiFi service by using a mobile data network of the SIM card 1.

406. After receiving the Wi-Fi handover command message delivered by the MME 1, the UE triggers the SIM card 2 to perform the VoWiFi service by using the mobile data network of the SIM card 1. The UE may discover an EPDG or preconfigure an EPDG by using a DNS, and may perform authentication in an LTE network of the SIM card 1.

407. The SIM card 2 of the UE may complete IKE tunnel creation and 3GPP AAA authentication in an IKEv2 procedure, and obtain, from a third EAP response message, PGW 2 information used when the SIM card 2 of the UE is registered with VoLTE. In addition, in this authentication procedure, if the UE keeps the network address during a handover, a service IP that is previously obtained when the E-UTRAN 2 is accessed is carried in CFG_Request in IKE signaling.

408. After receiving the third EAP response message, the EPDG starts to send a create session request message to the PGW 2, where the message may carry an IP address of the UE obtained from an IKE message; and the EPDG may set a handover identifier to 1 and set an RAT type to a WLAN.

409. After receiving the create session request message, the PGW 2 may interact with a PCRF by using a CCR/CCA message to obtain rule information corresponding to a Wi-Fi access scenario. The PGW 2 may report PGW ID information to 3GPP AAA through an AAR message, and the 3GPP AAA synchronizes the information to the HSS. The HSS may synchronize the PGW 2 information in the APN corresponding to the voice to the MME 2 by using an insert subscriber data message.

410. The PGW 2 may return a modify bearer response message to the EPDG for confirmation. After receiving a create session response message, the EPDG may send an IKE_AUTH message to the UE to complete an IPsec tunnel creation procedure.

411. The EPDG and the SIM card 2 of the UE complete IKEv2 message interaction and create an IPSec tunnel.

412. Because the handover identifier is set in step 408, the EPDG may send a modify bearer request message to the PGW 2. After receiving the modify bearer request message, the PGW 2 may hand over a downlink tunnel from 3GPP to a WLAN side.

413. The PGW 2 may return the modify bearer response message to the EPDG for confirmation.

414. The SIM card 2 of the UE may create an IPSec tunnel and a GTP tunnel by using an IP connection between the E-UTRAN 1 and the PGW 2, to be registered with VoWiFi, and may perform a call service by using VoWiFi.

415. The PGW 2 may initiate a PDN GW initiated bearer deactivation (S5/S8 uses GTP) process for 3GPP access, to release resources of VoLTE with which the SIM card 2 is previously registered.

416. If the UE detects that the mobile network signal parameter of the SIM card 1 is less than a sixth preset value, a measurement report (event Z3) to may be sent to the E-UTRAN 1, where measurement signal quality and strength information of a serving cell of the SIM card 2 and a serving cell of the SIM card 1 are carried.

417. The E-UTRAN 1 may forward the measurement report (event Z3) to an MME 1.

418. The MME 1 may forward the measurement report (event Z3) information to a PGW 1.

419. The PGW 1 may forward the measurement report (event Z3) information to the EPDG.

420. If the EPDG detects that the mobile network signal parameter of the SIM card 1 is less than the sixth preset value, the EPDG may deliver a Wi-Fi handover command message to the PGW 1; otherwise, the EPDG does not deliver the Wi-Fi handover command message.

421. The PGW 1 may forward the received Wi-Fi handover command message to the MME 1.

422. The MME 1 may forward the received Wi-Fi handover command message to the E-UTRAN 1.

423. The E-UTRAN 1 may forward the received Wi-Fi handover command message to the UE, to instruct the SIM card 2 of the UE to disconnect the current VoWiFi service.

424. The SIM card 2 may initiate de-attachment of the EPDG, and the PGW 2 may initiate a release process of a related bearer resource on a WLAN side of the SIM card 2 of the UE.

In this implementation, for a dual-card single-pass terminal, when a SIM card is on a VoLTE call, another SIM card may perform a VoWiFi call by using a mobile network connected to the SIM card, thereby indirectly resolving a problem that the dual-card single-pass terminal supports only single-pass.

Figure 6:
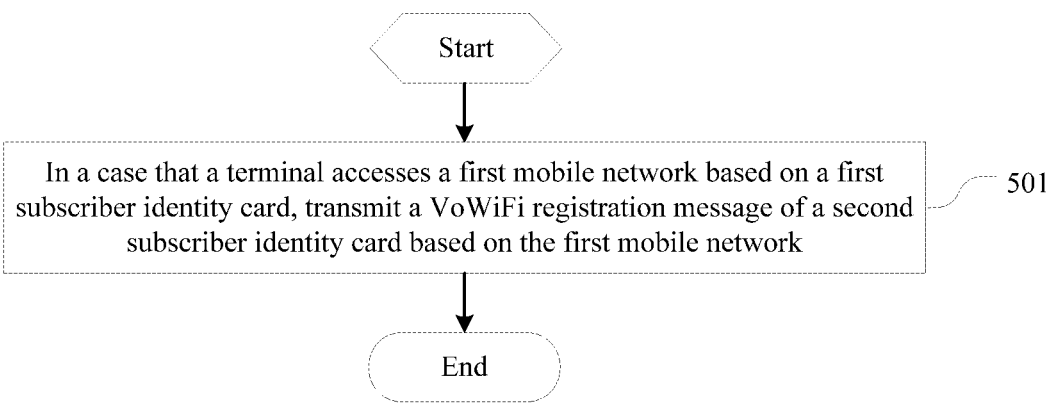
FIG. 6 is a second flowchart of a service registration method according to an embodiment of the present disclosure.

Referring to FIG. 6, FIG. 6 is a second flowchart of a service registration method according to an embodiment of the present disclosure. The method is performed by a network side device. As shown in FIG. 6, the method includes the following steps:

Step 501: In a case that a terminal accesses a first mobile network based on a first subscriber identity card, transmit a VoWiFi registration message of a second subscriber identity card based on the first mobile network, where the terminal includes a first subscriber identity card module and a second subscriber identity card module, the first subscriber identity card module is associated with the first subscriber identity card, and the second subscriber identity card module is associated with the second subscriber identity card.

In some embodiments, before the transmitting a VoWiFi registration message of a second subscriber identity card based on the first mobile network, the method further includes:

receiving a first handover request message sent by the terminal, where the first handover request message is used by the second subscriber identity card to request to perform a VoWiFi service; and sending a first handover response message to the terminal, where the first handover response message includes a network address of an EPDG network element of the network side device; and the transmitting a VoWiFi registration message of a second subscriber identity card based on the first mobile network includes:

transmitting the VoWiFi registration message of the second subscriber identity card based on the first mobile network and the EPDG network element.

In some embodiments, before the transmitting a VoWiFi registration message of a second subscriber identity card based on the first mobile network, the method further includes:

receiving first measurement report information sent by the terminal, where the first measurement report information includes a mobile network signal parameter of the second subscriber identity card; and sending a first handover command message to the terminal in a case that the terminal fails to detect a wireless local area network signal and a mobile network signal parameter of the second subscriber identity card is less than a fourth preset value, where the first handover command message is used to instruct the second subscriber identity card to perform VoWiFi registration; and the transmitting a VoWiFi registration message of a second subscriber identity card based on the first mobile network includes:

transmitting the VoWiFi registration message of the second subscriber identity card based on the first mobile network and the EPDG network element of the network side device.

In some embodiments, before the transmitting the VoWiFi registration message of the second subscriber identity card based on the first mobile network and the EPDG network element, the method further includes:

transmitting a call service message of the second subscriber identity card based on a second mobile network and a PGW network element of the network side device, where the terminal accesses the second mobile network based on the second subscriber identity card; and the transmitting the VoWiFi registration message of the second subscriber identity card based on the first mobile network and the EPDG network element includes:

transmitting the VoWiFi registration message of the second subscriber identity card based on the first mobile network, the EPDG network element, and the PGW network element.

In some embodiments, the method further includes:

receiving a second handover request message sent by the terminal, where the second handover request message is used to request to switch a call service of the second subscriber identity card to a VoLTE service; and sending a second handover response message to the terminal, where the second handover response message is used to instruct to switch the call service of the second subscriber identity card to the VoLTE service.

In some embodiments, the method further includes:

receiving second measurement report information sent by the terminal, where the second measurement report information includes mobile network signal parameters of the second subscriber identity card and the first subscriber identity card; and sending a second handover command message to the terminal in a case that a mobile network signal parameter of the second subscriber identity card is greater than a fifth preset value, and/or a mobile network signal parameter of the first subscriber identity card is less than a sixth preset value, where the second handover command message is used to instruct to switch a call service of the second subscriber identity card to a VoLTE service.

Figure 7:
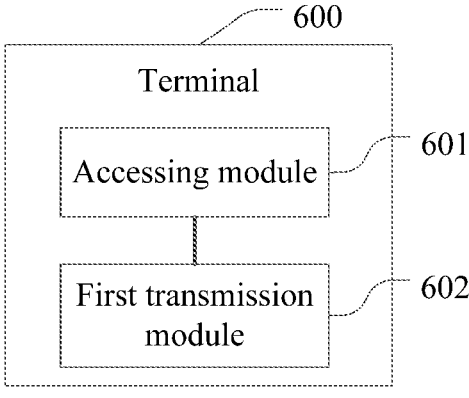
FIG. 7 is a first schematic structural diagram of a terminal according to an embodiment of the present disclosure.

It should be noted that this embodiment is used as an implementation of the network side device corresponding to the embodiment shown in FIG. 1. For a specific implementation of this embodiment, refer to the related descriptions of the embodiment shown in FIG. 1. To avoid repeated descriptions, details are not described again in this embodiment Referring to FIG. 7, FIG. 7 is a schematic structural diagram of a terminal according to an embodiment of the present disclosure. The terminal includes a first subscriber identity card module and a second subscriber identity card module (not shown in the figure), the first subscriber identity card module is associated with a first subscriber identity card, and the second subscriber identity card module is associated with a second subscriber identity card. As shown in FIG. 7, a terminal 600 includes:

an accessing module 601, configured to access a first mobile network based on the first subscriber identity card; and a first transmission module 602, configured to transmit a voice over wireless fidelity VoWiFi registration message of the second subscriber identity card based on the first mobile network.

Figure 8:
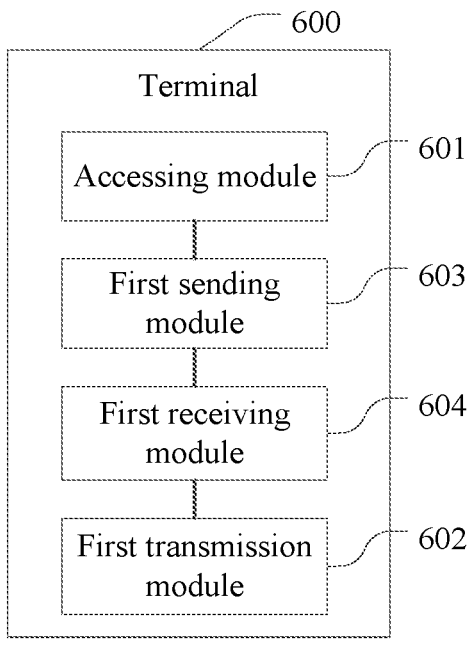
FIG. 8 is a second schematic structural diagram of a terminal according to an embodiment of the present disclosure.

In some embodiments, as shown in FIG. 8, the terminal 600 further includes:

a first sending module 603, configured to send a first handover request message to a network side device in a case that no wireless local area network signal is detected and a mobile network signal parameter of the second subscriber identity card is less than a first preset value, where the first handover request message is used by the second subscriber identity card to request to perform a VoWiFi service; and a first receiving module 604, configured to receive a first handover response message sent by the network side device, where the first handover response message includes a network address of an evolved packet data gateway EPDG network element of the network side device, where the first transmission module 602 is configured to:

transmit the voice over wireless fidelity VoWiFi registration message of the second subscriber identity card based on the first mobile network and the network address of the EPDG network element.

Figure 9:
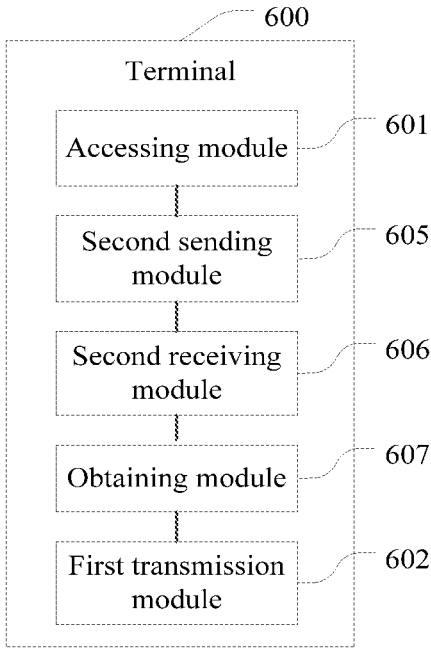
FIG. 9 is a third schematic structural diagram of a terminal according to an embodiment of the present disclosure.

In some embodiments, as shown in FIG. 9, the terminal 600 further includes:

a second sending module 605, configured to send first measurement report information to a network side device, where the first measurement report information includes a mobile network signal parameter of the second subscriber identity card;

a second receiving module 606, configured to receive a first handover command message sent by the network side device, where the first handover command message is used to instruct the second subscriber identity card to perform VoWiFi registration; and an obtaining module 607, configured to obtain a network address of an EPDG network element of the network side device, where the first transmission module 602 is configured to:

transmit the VoWiFi registration message of the second subscriber identity card based on the first mobile network and the network address of the EPDG network element.

Figure 10:
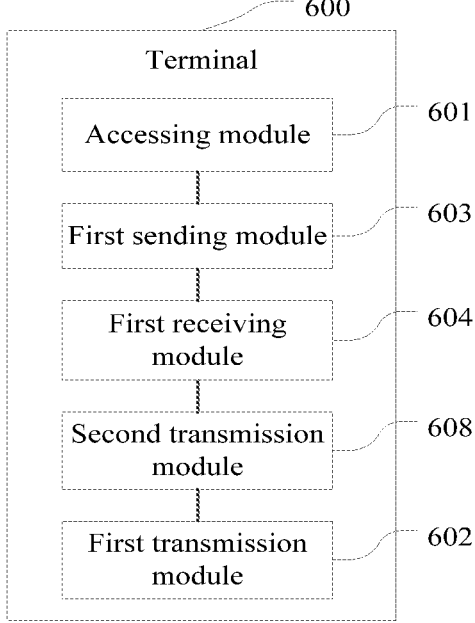
FIG. 10 is a fourth schematic structural diagram of a terminal according to an embodiment of the present disclosure.

In some embodiments, as shown in FIG. 10, the terminal 600 further includes:

a second transmission module 608, configured to transmit a call service message of the second subscriber identity card based on a second mobile network and a packet data network gateway PGW network element of the network side device, where the terminal accesses the second mobile network based on the second subscriber identity card, where the first transmission module 602 is configured to:

transmit the VoWiFi registration message of the second subscriber identity card based on the first mobile network, the network address of the EPDG network element, and the PGW network element.

Figure 11:
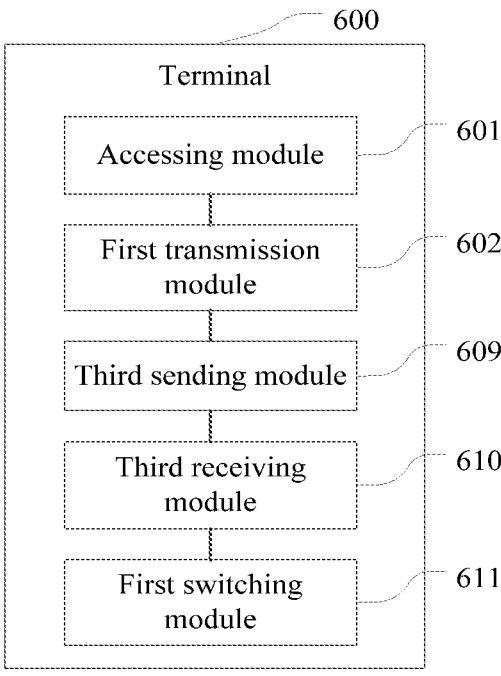
FIG. 11 is a fifth schematic structural diagram of a terminal according to an embodiment of the present disclosure.

In some embodiments, as shown in FIG. 11, the terminal 600 further includes:

a third sending module 609, configured to send a second handover request message to a network side device in a case that a mobile network signal parameter of the second subscriber identity card is greater than a second preset value, and/or a mobile network signal parameter of the first subscriber identity card is less than a third preset value, where the second handover request message is used to request to switch a call service of the second subscriber identity card to a VoLTE service;

a third receiving module 610, configured to receive a second handover response message sent by the network side device, where the second handover response message is used to instruct to switch the call service of the second subscriber identity card to the VoLTE service; and a first switching module 611, configured to switch the call service of the second subscriber identity card from a VoWiFi service to the VoLTE service.

Figure 12:
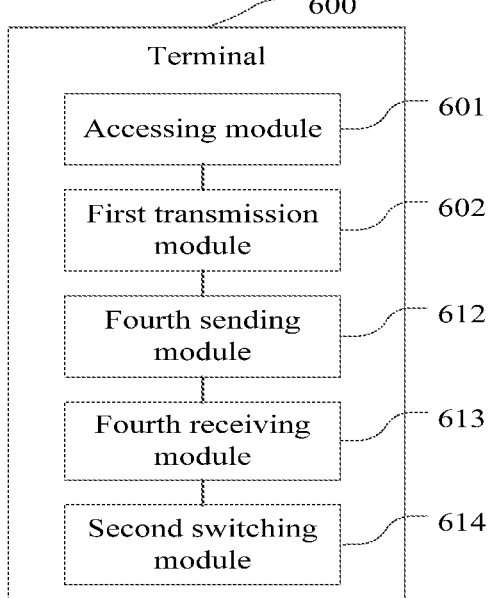
FIG. 12 is a sixth schematic structural diagram of a terminal according to an embodiment of the present disclosure.

In some embodiments, as shown in FIG. 12, the terminal 600 further includes:

a fourth sending module 612, configured to send second measurement report information to a network side device, where the second measurement report information includes mobile network signal parameters of the second subscriber identity card and the first subscriber identity card;

a fourth receiving module 613, configured to receive a second handover command message sent by the network side device, where the second handover command message is used to instruct to switch a call service of the second subscriber identity card to a VoLTE service; and a second switching module 614, configured to switch the call service of the second subscriber identity card from a VoWiFi service to the VoLTE service.

The terminal provided in this embodiment of the present disclosure can implement the processes implemented by the terminal in the method embodiment in FIG. 1. To avoid repetition, details are not described herein again.

Figure 13:
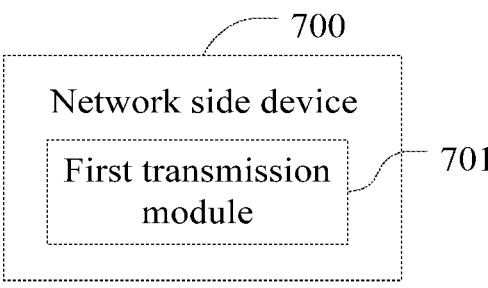
FIG. 13 is a first schematic structural diagram of a network side device according to an embodiment of the present disclosure.

Referring to FIG. 13, FIG. 13 is a schematic structural diagram of a network side device according to an embodiment of the present disclosure. As shown in FIG. 13, a network side device 700 includes:

a first transmission module 701, configured to: in a case that a terminal accesses a first mobile network based on a first subscriber identity card, transmit a VoWiFi registration message of a second subscriber identity card based on the first mobile network, where the terminal includes a first subscriber identity card module and a second subscriber identity card module, the first subscriber identity card module is associated with the first subscriber identity card, and the second subscriber identity card module is associated with the second subscriber identity card.

Figure 14:
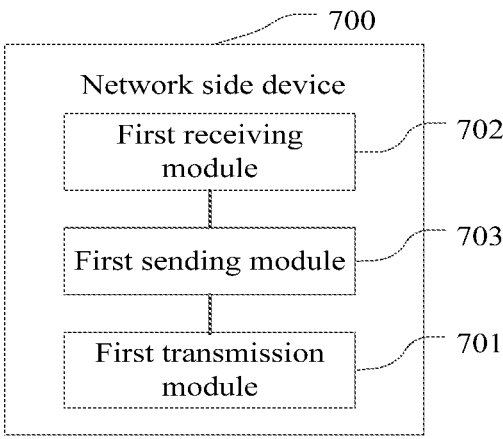
FIG. 14 is a second schematic structural diagram of a network side device according to an embodiment of the present disclosure.

In some embodiments, as shown in FIG. 14, the network side device 700 further includes:

a first receiving module 702, configured to receive a first handover request message sent by the terminal, where the first handover request message is used by the second subscriber identity card to request to perform a VoWiFi service; and a first sending module 703, configured to send a first handover response message to the terminal, where the first handover response message includes a network address of an EPDG network element of the network side device, where the first transmission module 701 is configured to:

transmit the VoWiFi registration message of the second subscriber identity card based on the first mobile network and the EPDG network element.

Figure 15:
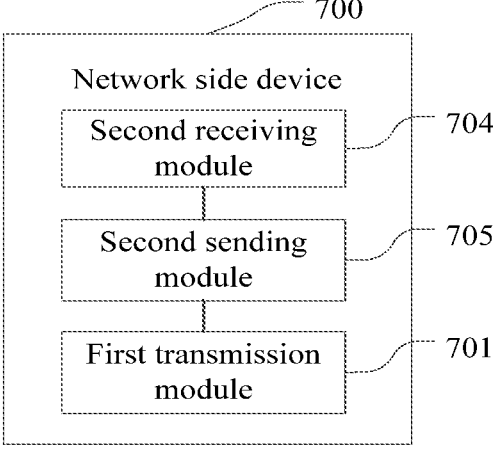
FIG. 15 is a third schematic structural diagram of a network side device according to an embodiment of the present disclosure.

In some embodiments, as shown in FIG. 15, the network side device 700 further includes:

a second receiving module 704, configured to receive first measurement report information sent by the terminal, where the first measurement report information includes a mobile network signal parameter of the second subscriber identity card; and a second sending module 705, configured to send a first handover command message to the terminal in a case that the terminal fails to detect a wireless local area network signal and a mobile network signal parameter of the second subscriber identity card is less than a fourth preset value, where the first handover command message is used to instruct the second subscriber identity card to perform VoWiFi registration, where the first transmission module 701 is configured to:

transmit the VoWiFi registration message of the second subscriber identity card based on the first mobile network and the EPDG network element of the network side device.

Figure 16:
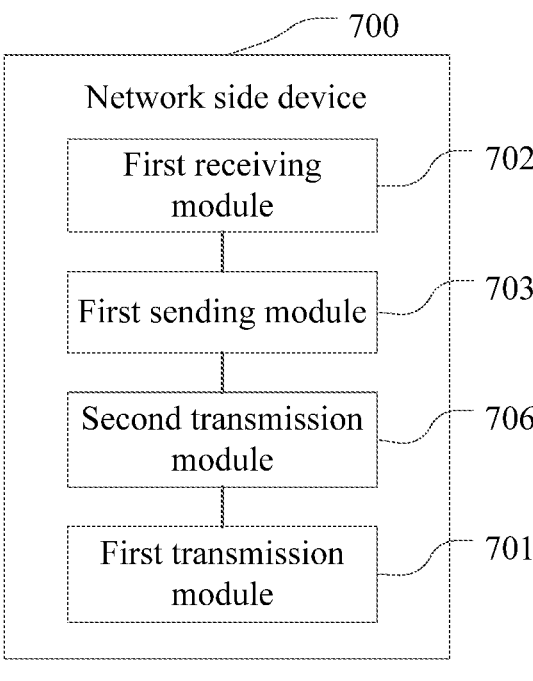
FIG. 16 is a fourth schematic structural diagram of a network side device according to an embodiment of the present disclosure.

In some embodiments, as shown in FIG. 16, the network side device 700 further includes:

a second transmission module 706, configured to transmit a call service message of the second subscriber identity card based on a second mobile network and a PGW network element of the network side device, where the terminal accesses the second mobile network based on the second subscriber identity card, where the first transmission module 701 is configured to:

transmit the VoWiFi registration message of the second subscriber identity card based on the first mobile network, the EPDG network element, and the PGW network element.

Figure 17:
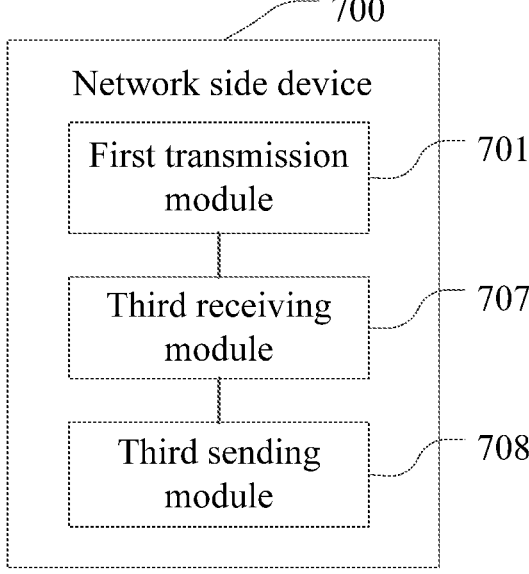
FIG. 17 is a fifth schematic structural diagram of a network side device according to an embodiment of the present disclosure.

In some embodiments, as shown in FIG. 17, the network side device 700 further includes:

a third receiving module 707, configured to receive a second handover request message sent by the terminal, where the second handover request message is used to request to switch a call service of the second subscriber identity card to a VoLTE service; and a third sending module 708, configured to send a second handover response message to the terminal, where the second handover response message is used to instruct to switch the call service of the second subscriber identity card to the VoLTE service.

Figure 18:
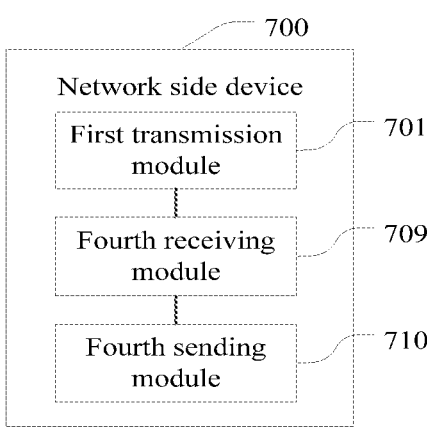
FIG. 18 is a sixth schematic structural diagram of a network side device according to an embodiment of the present disclosure.

In some embodiments, as shown in FIG. 18, the network side device 700 further includes:

a fourth receiving module 709, configured to receive second measurement report information sent by the terminal, where the second measurement report information includes mobile network signal parameters of the second subscriber identity card and the first subscriber identity card; and a fourth sending module 710, configured to send a second handover command message to the terminal in a case that a mobile network signal parameter of the second subscriber identity card is greater than a fifth preset value, and/or a mobile network signal parameter of the first subscriber identity card is less than a sixth preset value, where the second handover command message is used to instruct to switch a call service of the second subscriber identity card to a VoLTE service.

The network side device provided in this embodiment of the present disclosure can implement the processes implemented by the network side device in the method embodiment in FIG. 6. To avoid repetition, details are not described herein again.

Figure 19:
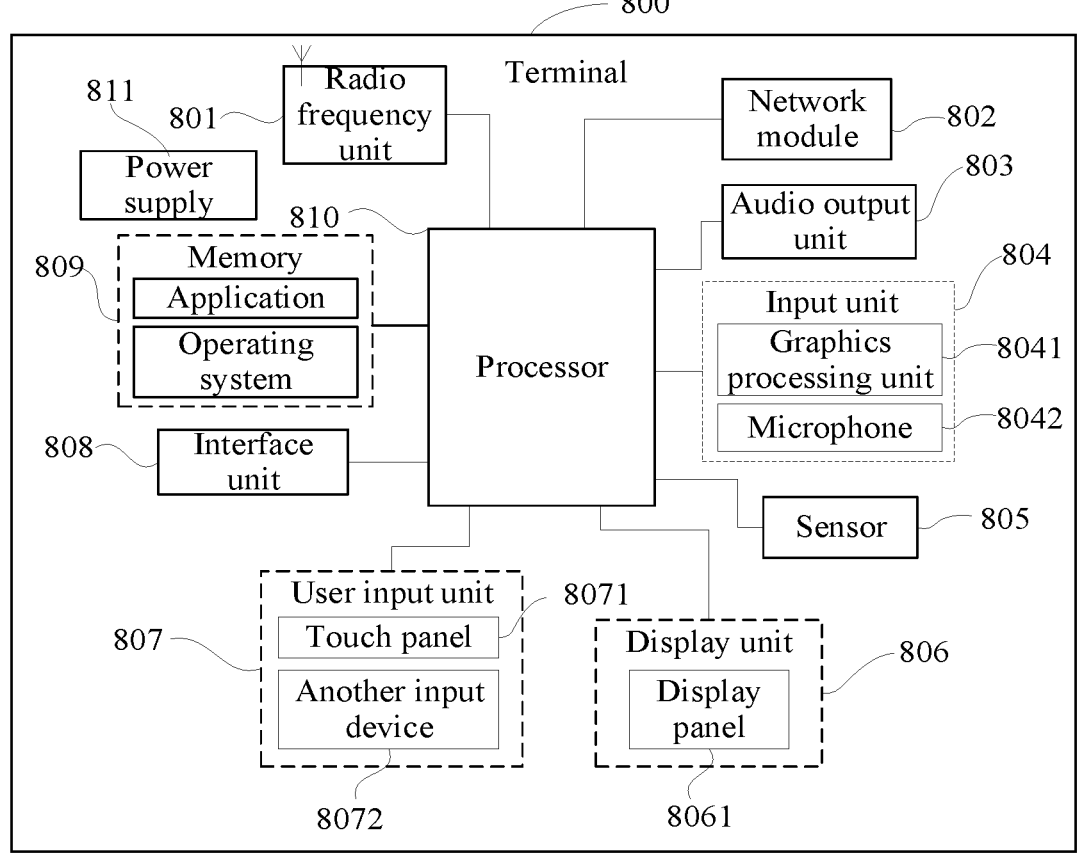
FIG. 19 is a seventh schematic structural diagram of a terminal according to an embodiment of the present disclosure.

FIG. 19 is a schematic diagram of a hardware structure of a terminal according to the embodiments of the present disclosure.

A terminal 800 includes but is not limited to components such as a radio frequency unit 801, a network module 802, an audio output unit 803, an input unit 804, a sensor 805, a display unit 806, a user input unit 807, an interface unit 808, a memory 809, a processor 810, and a power supply 811. It can be understood by a person skilled in the art that, the terminal structure shown in FIG. 19 does not constitute any limitation on the terminal, and the terminal may include more or fewer components than those shown in the figure, or combine some components, or have different component arrangements. In this embodiment of the present disclosure, the terminal includes but is not limited to a mobile phone, a tablet computer, a notebook computer, a palmtop computer, an in-vehicle terminal, a robot, a wearable device, a pedometer, and the like.

The terminal includes a first subscriber identity card module and a second subscriber identity card module (not shown in the figure), the first subscriber identity card module is associated with a first subscriber identity card, the second subscriber identity card module is associated with a second subscriber identity card, and the processor 810 is configured to:

access a first mobile network based on the first subscriber identity card; and transmit a voice over wireless fidelity VoWiFi registration message of the second subscriber identity card based on the first mobile network.

In some embodiments, the radio frequency unit 801 is configured to:

send a first handover request message to a network side device in a case that no wireless local area network signal is detected and a mobile network signal parameter of the second subscriber identity card is less than a first preset value, where the first handover request message is used by the second subscriber identity card to request to perform a VoWiFi service; and receive a first handover response message sent by the network side device, where the first handover response message includes a network address of an evolved packet data gateway EPDG network element of the network side device.

The processor 810 is further configured to:

transmit the voice over wireless fidelity VoWiFi registration message of the second subscriber identity card based on the first mobile network and the network address of the EPDG network element.

In some embodiments, the radio frequency unit 801 is further configured to:

send first measurement report information to a network side device, where the first measurement report information includes a mobile network signal parameter of the second subscriber identity card; and receive a first handover command message sent by the network side device, where the first handover command message is used to instruct the second subscriber identity card to perform VoWiFi registration.

The processor 810 is further configured to:

obtain a network address of an EPDG network element of the network side device; and transmit the VoWiFi registration message of the second subscriber identity card based on the first mobile network and the network address of the EPDG network element.

In some embodiments, the processor 810 is further configured to:

transmit a call service message of the second subscriber identity card based on a second mobile network and a packet data network gateway PGW network element of the network side device, where the terminal accesses the second mobile network based on the second subscriber identity card; and transmit the VoWiFi registration message of the second subscriber identity card based on the first mobile network, the network address of the EPDG network element, and the PGW network element.

In some embodiments, the radio frequency unit 801 is further configured to:

send a second handover request message to a network side device in a case that a mobile network signal parameter of the second subscriber identity card is greater than a second preset value, and/or a mobile network signal parameter of the first subscriber identity card is less than a third preset value, where the second handover request message is used to request to switch a call service of the second subscriber identity card to a VoLTE service; and receive a second handover response message sent by the network side device, where the second handover response message is used to instruct to switch the call service of the second subscriber identity card to the VoLTE service.

The processor 810 is further configured to:

switch the call service of the second subscriber identity card from a VoWiFi service to the VoLTE service.

In some embodiments, the radio frequency unit 801 is further configured to:

send second measurement report information to a network side device, where the second measurement report information includes mobile network signal parameters of the second subscriber identity card and the first subscriber identity card; and receive a second handover command message sent by the network side device, where the second handover command message is used to instruct to switch a call service of the second subscriber identity card to a VoLTE service.

The processor 810 is further configured to:

switch the call service of the second subscriber identity card from a VoWiFi service to the VoLTE service.

It should be understood that, in this embodiment of the present disclosure, the radio frequency unit 801 may be configured to receive and send information or a signal in a call process. In some embodiments, after receiving downlink data from a base station, the radio frequency unit 801 sends the downlink data to the processor 810 for processing. In addition, the radio frequency unit 801 sends uplink data to the base station. Usually, the radio frequency unit 801 includes but is not limited to an antenna, at least one amplifier, a transceiver, a coupler, a low noise amplifier, a duplexer, and the like. In addition, the radio frequency unit 801 may communicate with a network and another device through a wireless communication system.

The terminal provides wireless broadband Internet access for the user by using the network module 802, for example, helping the user to send and receive an e-mail, brows a web page, and access streaming media.

The audio output unit 803 may convert audio data received by the radio frequency unit 801 or the network module 802 or stored in the memory 809 into an audio signal and output the audio signal as a sound. In addition, the audio output unit 803 may further provide an audio output (for example, a call signal received voice, or a message received voice) related to a specific function implemented by the terminal 800. The audio output unit 803 includes a speaker, a buzzer, a telephone receiver, and the like.

The input unit 804 is configured to receive an audio signal or a video signal. The input unit 804 may include a Graphics Processing Unit (GPU) 8041 and a microphone 8042, and the graphics processing unit 8041 processes image data of a still picture or video obtained by an image capture apparatus (such as a camera) in a video capture mode or an image capture mode. A processed image frame may be displayed on the display unit 806. The image frame processed by the graphics processing unit 8041 may be stored in the memory 809 (or another storage medium) or sent by using the radio frequency unit 801 or the network module 802. The microphone 8042 may receive a sound and can process such sound into audio data. Processed audio data may be converted, in a call mode, into a format that can be sent to a mobile communication base station by using the radio frequency unit 801 for output.

The terminal 800 further includes at least one type of sensor 805, such as a light sensor, a motion sensor, and another sensor. In some embodiments, the light sensor includes an ambient light sensor and a proximity sensor. The ambient light sensor may adjust the luminance of the display panel 8061 based on the brightness of ambient light. The proximity sensor may turn off the display panel 8061 and/or backlight when the terminal 800 moves to an ear. As a type of the motion sensor, an accelerometer sensor may detect an acceleration value in each direction (generally, three axes), and detect a value and a direction of gravity when the accelerometer sensor is static, and may be used for recognizing a terminal posture (such as screen switching between landscape and portrait modes, a related game, or magnetometer posture calibration), a function related to vibration recognition (such as a pedometer or a knock), and the like. The sensor 805 may further include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information entered by a user or information provided for a user. The display unit 806 may include a display panel 8061. The display panel 8061 may be configured in a form of a Liquid Crystal Display (LCD), an Organic Light-Emitting Diode (OLED), or the like.

The user input unit 807 may be configured to receive input numeral or character information, and generate key signal input related to user setting and functional control of the terminal. In some embodiments, the user input unit 807 includes a touch panel 8071 and another input device 8072. The touch panel 8071 is also referred to as a touchscreen, and may collect a touch operation performed by a user on or near the touch panel 8071 (such as an operation performed by a user on the touch panel 8071 or near the touch panel 8071 by using any proper object or accessory, such as a finger or a stylus). The touch panel 8071 may include two parts: a touch detection apparatus and a touch controller. The touch detection apparatus detects a touch position of the user, detects a signal brought by the touch operation, and sends the signal to the touch controller. The touch controller receives touch information from the touch detection apparatus, converts the touch information into touch point coordinates, and sends the touch point coordinates to the processor 810, and can receive and execute a command sent by the processor 810. In addition, the touch panel 8071 may be of a resistive type, a capacitive type, an infrared type, a surface acoustic wave type, or the like. The user input unit 807 may include another input device 8072 in addition to the touch panel 8071. In some embodiments, the another input device 8072 may include but is not limited to a physical keyboard, a functional button (such as a volume control button or a power on/off button), a trackball, a mouse, and a joystick. Details are not described herein.

Further, the touch panel 8071 may cover the display panel 8061. When detecting the touch operation on or near the touch panel 8071, the touch panel 8071 transmits the touch operation to the processor 810 to determine a type of a touch event, and then the processor 810 provides corresponding visual output on the display panel 8061 based on the type of the touch event. In FIG. 19, although the touch panel 8071 and the display panel 8061 are used as two independent parts to implement input and output functions of the terminal, in some embodiments, the touch panel 8071 and the display panel 8061 may be integrated to implement the input and output functions of the terminal. This is not specifically limited herein.

The interface unit 808 is an interface for connecting an external apparatus with the terminal 800. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 808 may be configured to receive input (for example, data information and power) from an external apparatus and transmit the received input to one or more elements in the terminal 800 or may be configured to transmit data between the terminal 800 and an external apparatus.

The memory 809 may be configured to store a software program and various data. The memory 809 may mainly include a program storage area and a data storage area. The program storage area may store an operating system, an application required by at least one function (such as a sound play function or an image play function), and the like. The data storage area may store data (such as audio data or an address book) created based on use of the mobile phone, and the like. In addition, the memory 809 may include a high-speed random access memory, and may further include a nonvolatile memory, for example, at least one magnetic disk storage device, a flash storage device, or another volatile solid-state storage device.

The processor 810 is a control center of the terminal, and connects all parts of the entire terminal by using various interfaces and lines. By running or executing a software program and/or a module stored in the memory 809 and invoking data stored in the memory 809, the processor 810 performs various functions of the terminal and data processing, to perform overall monitoring on the terminal. The processor 810 may include one or more processing units. In some embodiments, an application processor and a modem processor may be integrated into the processor 810. The application processor mainly processes an operating system, a user interface, an application, and the like. The modem processor mainly processes wireless communications. It can be understood that, the modem processor may not be integrated into the processor 810.

The terminal 800 may further include the power supply 811 (such as a battery) that supplies power to each component. In some embodiments, the power supply 811 may be logically connected to the processor 810 by using a power management system, so as to implement functions such as charging, discharging, and power consumption management by using the power management system.

In addition, the terminal 800 includes some function modules not shown, and details are not described herein.

An embodiment of the present disclosure further provides a terminal, including a processor, a memory and a program that is stored in the memory and that can be run on the processor. When the program is executed by the processor, the processes of the foregoing embodiment of the service registration method performed by the terminal are implemented and a same technical effect can be achieved. To avoid repetition, details are not described herein again.

Figure 20:
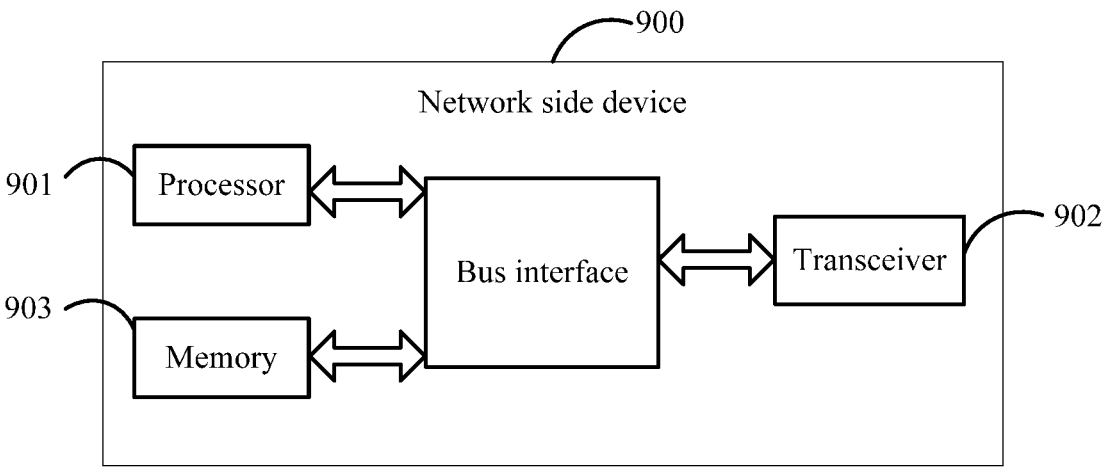
FIG. 20 is a seventh schematic structural diagram of a network side device according to an embodiment of the present disclosure.

Referring to FIG. 20, FIG. 20 is a schematic structural diagram of another network side device according to an embodiment of the present disclosure. As shown in FIG. 20, a network side device 900 includes a processor 901, a transceiver 902, a memory 903, and a bus interface.

The processor 901 is configured to: in a case that a terminal accesses a first mobile network based on a first subscriber identity card, transmit a VoWiFi registration message of a second subscriber identity card based on the first mobile network, where the terminal includes a first subscriber identity card module and a second subscriber identity card module, the first subscriber identity card module is associated with the first subscriber identity card, and the second subscriber identity card module is associated with the second subscriber identity card.

In some embodiments, the transceiver 902 is configured to receive a first handover request message sent by the terminal, where the first handover request message is used by the second subscriber identity card to request to perform a VoWiFi service;

the transceiver 902 is further configured to send a first handover response message to the terminal, where the first handover response message includes a network address of an EPDG network element of the network side device; and the processor 901 is further configured to transmit the VoWiFi registration message of the second subscriber identity card based on the first mobile network and the EPDG network element.

In some embodiments, the transceiver 902 is further configured to receive first measurement report information sent by the terminal, where the first measurement report information includes a mobile network signal parameter of the second subscriber identity card;

the transceiver 902 is further configured to send a first handover command message to the terminal in a case that the terminal fails to detect a wireless local area network signal and a mobile network signal parameter of the second subscriber identity card is less than a fourth preset value, where the first handover command message is used to instruct the second subscriber identity card to perform VoWiFi registration; and the processor 901 is further configured to transmit the VoWiFi registration message of the second subscriber identity card based on the first mobile network and the EPDG network element of the network side device.

In some embodiments, the processor 901 is further configured to transmit a call service message of the second subscriber identity card based on a second mobile network and a PGW network element of the network side device, where the terminal accesses the second mobile network based on the second subscriber identity card; and the processor 901 is further configured to transmit the VoWiFi registration message of the second subscriber identity card based on the first mobile network, the EPDG network element, and the PGW network element.

In some embodiments, the transceiver 902 is further configured to receive a second handover request message sent by the terminal, where the second handover request message is used to request to switch a call service of the second subscriber identity card to a VoLTE service; and the transceiver 902 is further configured to send a second handover response message to the terminal, where the second handover response message is used to instruct to switch the call service of the second subscriber identity card to the VoLTE service.

In some embodiments, the transceiver 902 is further configured to receive second measurement report information sent by the terminal, where the second measurement report information includes mobile network signal parameters of the second subscriber identity card and the first subscriber identity card; and the transceiver 902 is further configured to send a second handover command message to the terminal in a case that a mobile network signal parameter of the second subscriber identity card is greater than a fifth preset value, and/or a mobile network signal parameter of the first subscriber identity card is less than a sixth preset value, where the second handover command message is used to instruct to switch a call service of the second subscriber identity card to a VoLTE service.

The transceiver 902 is configured to receive and send data under the control of the processor 901. The transceiver 902 includes at least two antenna ports.

In FIG. 20, a bus architecture may include any quantity of interconnected buses and bridges. In some embodiments, various circuits of one or more processors represented by the processor 901 and a memory represented by the memory 903 are interconnected. The bus architecture may further link various other circuits such as a peripheral device, a voltage regulator, and a power management circuit. These are well known in the art, and therefore are not further described in this specification. A bus interface provides an interface. The transceiver 902 may be a plurality of components. To be specific, the transceiver 902 includes a transmitter and a receiver, and provides a unit configured to communicate with various other apparatuses on a transmission medium. The processor 901 is responsible for bus architecture management and general processing. The memory 903 may store data used by the processor 901 when the processor 901 performs an operation.

An embodiment of the present disclosure further provides a network side device, including a processor, a memory and a program that is stored in the memory and that can be run on the processor. When the program is executed by the processor, the processes of the foregoing embodiment of the service registration method performed by the network side device are implemented and a same technical effect can be achieved. To avoid repetition, details are not described herein again.

An embodiment of the present disclosure further provides a computer-readable storage medium. The computer-readable storage medium stores a computer program. When the computer program is executed by a processor, the processes of the service registration method performed by the terminal are implemented, or when the computer program is executed by a processor, the processes of the service registration method performed by the network side device are implemented and a same technical effect can be achieved. To avoid repetition, details are not described herein again. The computer-readable storage medium includes a Read-only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of the present disclosure essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the above specific implementations, and the above specific implementations are only illustrative and not restrictive. Under the enlightenment of the present disclosure, those of ordinary skill in the art can make many forms without departing from the purpose of the present disclosure and the protection scope of the claims, all of which fall within the protection of the present disclosure.

What is claimed is:

1. A method for service registration, performed by a terminal, wherein the terminal comprises a first subscriber identity card module associated with a first subscriber identity card and a second subscriber identity card module associated with a second subscriber identity card, and the method comprises:

accessing a first mobile network based on the first subscriber identity card; and transmitting a voice over wireless fidelity (VoWiFi) registration message of the second subscriber identity card based on the first mobile network, wherein before transmitting the VoWiFi registration message of the second subscriber identity card based on the first mobile network, the method further comprises:

sending a first handover request message to a network side device when no wireless local area network signal is detected and a mobile network signal parameter of the second subscriber identity card is less than a first preset value, wherein the first handover request message is used by the second subscriber identity card to request to perform a VoWiFi service; and receiving a first handover response message sent by the network side device, wherein the first handover response message comprises a network address of an evolved packet data gateway (EPDG) network element of the network side device.

2. The method according to claim 1, wherein transmitting the VoWiFi registration message of the second subscriber identity card based on the first mobile network comprises:

transmitting the VoWiFi registration message of the second subscriber identity card based on the first mobile network and the network address of the EPDG network element.

3. The method according to claim 1, wherein before transmitting the VoWiFi registration message of the second subscriber identity card based on the first mobile network, the method further comprises:

sending first measurement report information to the network side device, wherein the first measurement report information comprises the mobile network signal parameter of the second subscriber identity card;

receiving a first handover command message sent by the network side device, wherein the first handover command message is used to instruct the second subscriber identity card to perform VoWiFi registration; and obtaining the network address of the EPDG network element of the network side device, wherein transmitting the VoWiFi registration message of the second subscriber identity card based on the first mobile network comprises:

transmitting the VoWiFi registration message of the second subscriber identity card based on the first mobile network and the network address of the EPDG network element.

4. The method according to claim 3, further comprising:

sending second measurement report information to the network side device, wherein the second measurement report information comprises mobile network signal parameters of the second subscriber identity card and the first subscriber identity card;

receiving a second handover command message sent by the network side device, wherein the second handover command message is used to instruct to switch a call service of the second subscriber identity card to a VoLTE service; and switching the call service of the second subscriber identity card from the VoWiFi service to the VoLTE service.

5. The method according to claim 1, wherein before transmitting the VoWiFi registration message of the second subscriber identity card based on the first mobile network and the network address of the EPDG network element, the method further comprises:

transmitting a call service message of the second subscriber identity card based on a second mobile network and a packet data network gateway (PGW) network element of the network side device, wherein the terminal accesses the second mobile network based on the second subscriber identity card, wherein the transmitting the VoWiFi registration message of the second subscriber identity card based on the first mobile network and the network address of the EPDG network element comprises:

transmitting the VoWiFi registration message of the second subscriber identity card based on the first mobile network, the network address of the EPDG network element, and the PGW network element.

6. The method according to claim 1, further comprising:

sending a second handover request message to the network side device when the mobile network signal parameter of the second subscriber identity card is greater than a second preset value, or the mobile network signal parameter of the first subscriber identity card is less than a third preset value, wherein the second handover request message is used to request to switch a call service of the second subscriber identity card to a VoLTE service;

receiving a second handover response message sent by the network side device, wherein the second handover response message is used to instruct to switch the call service of the second subscriber identity card to the VoLTE service; and switching the call service of the second subscriber identity card from the VoWiFi service to the VoLTE service.

7. A service registration method, performed by a network side device, comprising:

when a terminal accesses a first mobile network based on a first subscriber identity card, transmitting a VoWiFi registration message of a second subscriber identity card based on the first mobile network, wherein the terminal comprises a first subscriber identity card module and a second subscriber identity card module, the first subscriber identity card module is associated with the first subscriber identity card, and the second subscriber identity card module is associated with the second subscriber identity card, wherein before transmitting the VoWiFi registration message of the second subscriber identity card based on the first mobile network, the method further comprises:

receiving a first handover request message sent by the terminal, wherein the first handover request message is used by the second subscriber identity card to request to perform a VoWiFi service; and sending a first handover response message to the terminal, wherein the first handover response message comprises a network address of an evolved packet data gateway (EPDG) network element of the network side device.

8. The method according to claim 7, wherein transmitting the VoWiFi registration message of the second subscriber identity card based on the first mobile network comprises:

transmitting the VoWiFi registration message of the second subscriber identity card based on the first mobile network and the EPDG network element.

9. The method according to claim 7, wherein before transmitting the VoWiFi registration message of the second subscriber identity card based on the first mobile network, the method further comprises:

receiving first measurement report information sent by the terminal, wherein the first measurement report information comprises a mobile network signal parameter of the second subscriber identity card; and sending a first handover command message to the terminal when the terminal fails to detect a wireless local area network signal and the mobile network signal parameter of the second subscriber identity card is less than a fourth preset value, wherein the first handover command message is used to instruct the second subscriber identity card to perform VoWiFi registration, wherein transmitting the VoWiFi registration message of the second subscriber identity card based on the first mobile network comprises:

transmitting the VoWiFi registration message of the second subscriber identity card based on the first mobile network and the EPDG network element of the network side device.

10. The method according to claim 9, further comprising:

receiving second measurement report information sent by the terminal, wherein the second measurement report information comprises mobile network signal parameters of the second subscriber identity card and the first subscriber identity card; and sending a second handover command message to the terminal when the mobile network signal parameter of the second subscriber identity card is greater than a fifth preset value, or the mobile network signal parameter of the first subscriber identity card is less than a sixth preset value, wherein the second handover command message is used to instruct to switch a call service of the second subscriber identity card to a VoLTE service.

11. The method according to claim 7, wherein before transmitting the VoWiFi registration message of the second subscriber identity card based on the first mobile network and the EPDG network element, the method further comprises:

transmitting a call service message of the second subscriber identity card based on a second mobile network and a PGW network element of the network side device, wherein the terminal accesses the second mobile network based on the second subscriber identity card, wherein transmitting the VoWiFi registration message of the second subscriber identity card based on the first mobile network and the EPDG network element comprises:

transmitting the VoWiFi registration message of the second subscriber identity card based on the first mobile network, the EPDG network element, and the PGW network element.

12. The method according to claim 7, further comprising:

receiving a second handover request message sent by the terminal, wherein the second handover request message is used to request to switch a call service of the second subscriber identity card to a VoLTE service; and sending a second handover response message to the terminal, wherein the second handover response message is used to instruct to switch the call service of the second subscriber identity card to the VoLTE service.

13. A terminal, comprising:

a first subscriber identity card module associated with a first subscriber identity card;

a second subscriber identity card module associated with a second subscriber identity card;

a memory storing a computer program; and a processor coupled to the memory and configured to execute the computer program to perform operations comprising:

accessing a first mobile network based on the first subscriber identity card; and transmitting a voice over wireless fidelity (VoWiFi) registration message of the second subscriber identity card based on the first mobile network, wherein before transmitting the VoWiFi registration message of the second subscriber identity card based on the first mobile network, the operations further comprises:

sending a first handover request message to a network side device when no wireless local area network signal is detected and a mobile network signal parameter of the second subscriber identity card is less than a first preset value, wherein the first handover request message is used by the second subscriber identity card to request to perform a VoWiFi service; and receiving a first handover response message sent by the network side device, wherein the first handover response message comprises a network address of an evolved packet data gateway (EPDG) network element of the network side device.

14. The terminal according to claim 13, wherein transmitting the VoWiFi registration message of the second subscriber identity card based on the first mobile network comprises:

transmitting the VoWiFi registration message of the second subscriber identity card based on the first mobile network and the network address of the EPDG network element.

15. The terminal according to claim 13, wherein before transmitting the VoWiFi registration message of the second subscriber identity card based on the first mobile network, the operations further comprise:

sending first measurement report information to the network side device, wherein the first measurement report information comprises the mobile network signal parameter of the second subscriber identity card;

receiving a first handover command message sent by the network side device, wherein the first handover command message is used to instruct the second subscriber identity card to perform VoWiFi registration; and obtaining the network address of the EPDG network element of the network side device, wherein transmitting the VoWiFi registration message of the second subscriber identity card based on the first mobile network comprises:

transmitting the VoWiFi registration message of the second subscriber identity card based on the first mobile network and the network address of the EPDG network element.

16. The terminal according to claim 15, wherein the operations further comprise:

sending second measurement report information to the network side device, wherein the second measurement report information comprises mobile network signal parameters of the second subscriber identity card and the first subscriber identity card;

receiving a second handover command message sent by the network side device, wherein the second handover command message is used to instruct to switch a call service of the second subscriber identity card to a VoLTE service; and switching the call service of the second subscriber identity card from the VoWiFi service to the VoLTE service.

17. The terminal according to claim 13, wherein before transmitting the VoWiFi registration message of the second subscriber identity card based on the first mobile network and the network address of the EPDG network element, the operations further comprise:

transmitting a call service message of the second subscriber identity card based on a second mobile network and a packet data network gateway (PGW) network element of the network side device, wherein the terminal accesses the second mobile network based on the second subscriber identity card, wherein the transmitting the VoWiFi registration message of the second subscriber identity card based on the first mobile network and the network address of the EPDG network element comprises:

transmitting the VoWiFi registration message of the second subscriber identity card based on the first mobile network, the network address of the EPDG network element, and the PGW network element.

18. The terminal according to claim 13, wherein the operations further comprise:

sending a second handover request message to the network side device when the mobile network signal parameter of the second subscriber identity card is greater than a second preset value, or the mobile network signal parameter of the first subscriber identity card is less than a third preset value, wherein the second handover request message is used to request to switch a call service of the second subscriber identity card to a VoLTE service;

receiving a second handover response message sent by the network side device, wherein the second handover response message is used to instruct to switch the call service of the second subscriber identity card to the VoLTE service; and switching the call service of the second subscriber identity card from the VoWiFi service to the VoLTE service.

* * * * *